(12) United States Patent
Hansen

(10) Patent No.: US 9,158,741 B1
(45) Date of Patent: Oct. 13, 2015

(54) INDICATORS FOR NAVIGATING DIGITAL WORKS

(75) Inventor: Linsey R. Hansen, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 623 days.

(21) Appl. No.: 13/284,446

(22) Filed: Oct. 28, 2011

(51) Int. Cl.
G06F 3/048 (2013.01)
G06F 17/21 (2006.01)
G06F 3/0483 (2013.01)

(52) U.S. Cl.
CPC .............. G06F 17/21 (2013.01); G06F 3/0483 (2013.01)

(58) Field of Classification Search
CPC ............................... G06F 17/21; G06F 3/0483
USPC .......................................... 715/781, 764, 780
See application file for complete search history.

(56) References Cited

U.S. PATENT DOCUMENTS

| | | |
|---|---|---|
| 2,684,955 A | 9/1954 | Knowles |
| 4,622,627 A | 11/1986 | Rodriguez et al. |
| 4,985,697 A | 1/1991 | Boulton |
| 5,418,549 A | 5/1995 | Anderson et al. |
| 5,495,268 A | 2/1996 | Pearson et al. |
| 5,499,359 A | 3/1996 | Vijaykumar |
| 5,517,407 A | 5/1996 | Weiner |
| 5,544,305 A | 8/1996 | Ohmaye et al. |
| 5,566,098 A | 10/1996 | Lucente et al. |
| 5,600,775 A | 2/1997 | King et al. |
| 5,623,260 A | 4/1997 | Jones |
| 5,630,159 A | 5/1997 | Zancho |
| 5,640,553 A | 6/1997 | Schultz |
| 5,659,742 A | 8/1997 | Beattie et al. |
| 5,661,635 A | 8/1997 | Huffman et al. |
| 5,663,748 A | 9/1997 | Huffman et al. |
| 5,696,982 A | 12/1997 | Tanigawa et al. |
| 5,710,922 A | 1/1998 | Alley et al. |
| 5,742,905 A | 4/1998 | Pepe et al. |
| 5,761,485 A | 6/1998 | Munyan |
| 5,765,168 A | 6/1998 | Burrows |
| 5,774,109 A | 6/1998 | Winksy et al. |

(Continued)

FOREIGN PATENT DOCUMENTS

| | | |
|---|---|---|
| CN | 1362682 | 8/2002 |
| CN | 1841373 | 10/2006 |

(Continued)

OTHER PUBLICATIONS

The Chinese Office Action mailed Aug. 3, 2012 for Chinese patent application No. 200880025056.5, a counterpart foreign application of U.S. Appl. No. 11/763,374, 17 pages.

(Continued)

*Primary Examiner* — Tadeese Hailu
(74) *Attorney, Agent, or Firm* — Lee & Hayes, PLLC

(57) ABSTRACT

This disclosure describes, in part, a progress gauge used to indicate a user's location in a digital work and to associate locations within the digital work with corresponding locations on the progress gauge. For instance, a progress gauge as described herein may comprise a progress bar having numerous segments corresponding to different sections (e.g., chapters, acts, scenes, etc.) within a digital work. Each segment of the progress bar may include a unique visual indicator, while each page within the corresponding section of the digital work may also include the same unique visual indicator or another type of indicator that maps to the visual indicator on the progress bar.

27 Claims, 15 Drawing Sheets

(56) References Cited

U.S. PATENT DOCUMENTS

| | | | |
|---|---|---|---|
| 5,813,017 A | 9/1998 | Morris | |
| 5,845,278 A | 12/1998 | Kirsch et al. | |
| 5,845,301 A | 12/1998 | Rivette et al. | |
| 5,847,698 A | 12/1998 | Reavey et al. | |
| 5,892,900 A | 4/1999 | Ginter et al. | |
| 5,923,861 A | 7/1999 | Bertram et al. | |
| 5,930,026 A | 7/1999 | Jacobson et al. | |
| 5,940,846 A | 8/1999 | Akiyama | |
| 5,956,048 A | 9/1999 | Gaston | |
| 5,960,411 A | 9/1999 | Hartman et al. | |
| 5,973,681 A | 10/1999 | Tanigawa et al. | |
| 5,991,439 A | 11/1999 | Tanaka et al. | |
| 6,018,575 A | 1/2000 | Gross et al. | |
| 6,034,839 A | 3/2000 | Hamming | |
| 6,037,954 A | 3/2000 | McMahon | |
| 6,041,335 A | 3/2000 | Merritt et al. | |
| 6,047,189 A | 4/2000 | Yun et al. | |
| 6,049,334 A * | 4/2000 | Bates et al. | 715/755 |
| 6,049,796 A | 4/2000 | Siitonen et al. | |
| 6,064,980 A | 5/2000 | Jacobi et al. | |
| 6,073,148 A | 6/2000 | Rowe et al. | |
| 6,113,394 A | 9/2000 | Edgar | |
| 6,148,340 A | 11/2000 | Bittinger et al. | |
| 6,154,757 A | 11/2000 | Krause et al. | |
| 6,164,974 A | 12/2000 | Carlile et al. | |
| 6,195,698 B1 | 2/2001 | Lillibridge et al. | |
| 6,201,771 B1 | 3/2001 | Otsuka et al. | |
| 6,226,642 B1 | 5/2001 | Beranek et al. | |
| 6,233,318 B1 | 5/2001 | Picard et al. | |
| 6,272,461 B1 | 8/2001 | Meredith et al. | |
| 6,300,947 B1 | 10/2001 | Kanevsky | |
| 6,308,320 B1 | 10/2001 | Burch | |
| 6,313,828 B1 | 11/2001 | Chombo | |
| 6,331,866 B1 * | 12/2001 | Eisenberg | 715/784 |
| 6,331,867 B1 | 12/2001 | Eberhard et al. | |
| 6,335,678 B1 | 1/2002 | Heutschi | |
| 6,351,750 B1 | 2/2002 | Duga et al. | |
| 6,385,596 B1 | 5/2002 | Wiser et al. | |
| 6,401,086 B1 | 6/2002 | Bruckner | |
| 6,401,239 B1 | 6/2002 | Miron | |
| 6,442,651 B2 | 8/2002 | Crow et al. | |
| 6,449,627 B1 | 9/2002 | Baer et al. | |
| 6,457,030 B1 | 9/2002 | Adams et al. | |
| 6,466,951 B1 | 10/2002 | Birkler et al. | |
| 6,484,212 B1 | 11/2002 | Markowitz et al. | |
| 6,487,669 B1 | 11/2002 | Waring | |
| 6,493,734 B1 | 12/2002 | Sachs et al. | |
| 6,496,803 B1 | 12/2002 | Seet et al. | |
| 6,529,920 B1 | 3/2003 | Arons et al. | |
| 6,535,857 B1 | 3/2003 | Clarke, III et al. | |
| 6,542,874 B1 | 4/2003 | Walker et al. | |
| 6,559,882 B1 | 5/2003 | Kerchner | |
| 6,560,699 B1 | 5/2003 | Konkle | |
| 6,574,658 B1 | 6/2003 | Gabber et al. | |
| 6,629,138 B1 | 9/2003 | Lambert et al. | |
| 6,631,495 B2 | 10/2003 | Kato et al. | |
| 6,642,947 B2 | 11/2003 | Feierbach | |
| 6,658,623 B1 | 12/2003 | Schilit et al. | |
| 6,685,482 B2 | 2/2004 | Hopp et al. | |
| 6,687,878 B1 | 2/2004 | Eintracht et al. | |
| 6,704,733 B2 | 3/2004 | Clark et al. | |
| 6,721,869 B1 | 4/2004 | Senthil | |
| 6,724,403 B1 | 4/2004 | Santoro et al. | |
| 6,725,227 B1 | 4/2004 | Li | |
| 6,726,487 B1 | 4/2004 | Dalstrom | |
| 6,735,583 B1 | 5/2004 | Bjarnestam et al. | |
| 6,744,891 B1 | 6/2004 | Allen | |
| 6,744,967 B2 | 6/2004 | Kaminski et al. | |
| 6,801,751 B1 | 10/2004 | Wood et al. | |
| 6,803,930 B1 * | 10/2004 | Simonson | 715/784 |
| 6,804,489 B2 | 10/2004 | Stuppy et al. | |
| 6,829,594 B1 | 12/2004 | Kitamura | |
| 6,847,966 B1 | 1/2005 | Sommer et al. | |
| 6,904,449 B1 | 6/2005 | Quinones | |
| 6,912,398 B1 | 6/2005 | Domnitz | |
| 6,933,928 B1 | 8/2005 | Lilienthal | |
| 6,938,076 B2 | 8/2005 | Meyer et al. | |
| 6,947,922 B1 | 9/2005 | Glance | |
| 6,948,135 B1 | 9/2005 | Ruthfield et al. | |
| 6,953,343 B2 | 10/2005 | Townshend | |
| 6,966,029 B1 | 11/2005 | Ahern | |
| 6,980,652 B1 | 12/2005 | Braitberg et al. | |
| 6,985,932 B1 | 1/2006 | Glaser et al. | |
| 6,992,687 B1 * | 1/2006 | Baird et al. | 715/805 |
| 6,999,565 B1 | 2/2006 | Delaney et al. | |
| 7,007,015 B1 | 2/2006 | Nayak | |
| 7,009,596 B2 | 3/2006 | Seet et al. | |
| 7,010,500 B2 | 3/2006 | Aarnio | |
| 7,020,654 B1 | 3/2006 | Najmi | |
| 7,020,663 B2 | 3/2006 | Hay et al. | |
| 7,054,914 B2 | 5/2006 | Suzuki et al. | |
| 7,057,591 B1 | 6/2006 | Hautanen et al. | |
| 7,062,707 B1 | 6/2006 | Knauft et al. | |
| 7,071,930 B2 | 7/2006 | Kondo et al. | |
| 7,080,076 B1 | 7/2006 | Williamson et al. | |
| 7,089,292 B1 | 8/2006 | Roderick et al. | |
| 7,092,116 B2 | 8/2006 | Calaway | |
| 7,103,848 B2 | 9/2006 | Barsness et al. | |
| 7,107,533 B2 | 9/2006 | Duncan et al. | |
| 7,111,250 B1 | 9/2006 | Hayward et al. | |
| 7,130,841 B1 | 10/2006 | Goel et al. | |
| 7,133,506 B1 | 11/2006 | Smith | |
| 7,135,932 B2 | 11/2006 | Quadir et al. | |
| 7,149,776 B1 | 12/2006 | Roy et al. | |
| 7,165,217 B1 | 1/2007 | Kondo | |
| 7,181,502 B2 | 2/2007 | Incertis | |
| 7,188,085 B2 | 3/2007 | Pelletier | |
| 7,191,346 B2 | 3/2007 | Abe et al. | |
| 7,209,888 B2 | 4/2007 | Frid-Nielsen et al. | |
| 7,216,116 B1 | 5/2007 | Nilsson et al. | |
| 7,237,123 B2 | 6/2007 | LeVine et al. | |
| 7,246,118 B2 | 7/2007 | Chastain et al. | |
| 7,249,046 B1 | 7/2007 | Katsurabayashi et al. | |
| 7,249,060 B2 | 7/2007 | Ling | |
| 7,249,324 B2 | 7/2007 | Nakamura et al. | |
| 7,257,577 B2 | 8/2007 | Fagin et al. | |
| 7,287,068 B1 | 10/2007 | Eriksson et al. | |
| 7,290,285 B2 | 10/2007 | McCurdy et al. | |
| 7,298,851 B1 | 11/2007 | Hendricks et al. | |
| 7,304,635 B2 | 12/2007 | Seet et al. | |
| 7,310,629 B1 | 12/2007 | Mendelson et al. | |
| 7,313,759 B2 | 12/2007 | Sinisi | |
| 7,350,704 B2 | 4/2008 | Barsness et al. | |
| 7,355,591 B2 | 4/2008 | Sugimoto | |
| 7,375,649 B2 | 5/2008 | Gueziec | |
| 7,383,505 B2 | 6/2008 | Shimizu et al. | |
| 7,386,480 B2 | 6/2008 | Sarig | |
| 7,386,804 B2 | 6/2008 | Ho et al. | |
| 7,398,244 B1 | 7/2008 | Keith | |
| 7,401,286 B1 | 7/2008 | Hendricks et al. | |
| 7,454,238 B2 | 11/2008 | Vinayak et al. | |
| 7,461,406 B2 | 12/2008 | Pelly et al. | |
| 7,496,767 B2 | 2/2009 | Evans | |
| 7,506,246 B2 | 3/2009 | Hollander et al. | |
| 7,506,356 B2 | 3/2009 | Gupta et al. | |
| 7,509,270 B1 | 3/2009 | Hendricks et al. | |
| 7,519,278 B2 | 4/2009 | Ikeda et al. | |
| 7,533,152 B2 | 5/2009 | Stark et al. | |
| 7,539,478 B2 | 5/2009 | Herley et al. | |
| 7,562,032 B2 | 7/2009 | Abbosh et al. | |
| 7,562,038 B1 | 7/2009 | Brumfield et al. | |
| 7,574,653 B2 | 8/2009 | Croney et al. | |
| 7,631,013 B2 | 12/2009 | Parsons et al. | |
| 7,634,429 B2 | 12/2009 | Narin et al. | |
| 7,656,127 B1 | 2/2010 | Shutt et al. | |
| 7,657,459 B2 | 2/2010 | Anderson et al. | |
| 7,657,831 B2 | 2/2010 | Donahue | |
| 7,680,849 B2 | 3/2010 | Heller et al. | |
| 7,716,224 B2 | 5/2010 | Reztlaff, II et al. | |
| 7,720,892 B1 | 5/2010 | Healey, Jr. et al. | |
| 7,747,949 B2 | 6/2010 | Incertis Carro | |
| 7,760,986 B2 | 7/2010 | Beuque | |
| 7,788,369 B2 | 8/2010 | McAllen et al. | |
| 7,792,756 B2 | 9/2010 | Plastina et al. | |

(56) References Cited

U.S. PATENT DOCUMENTS

| Patent/Publication | Date | Inventor |
|---|---|---|
| 7,835,989 B1 | 11/2010 | Hendricks et al. |
| 7,849,393 B1 | 12/2010 | Hendricks et al. |
| 7,865,405 B2 | 1/2011 | Hendricks et al. |
| 7,865,567 B1 | 1/2011 | Hendricks et al. |
| 7,865,817 B2 | 1/2011 | Ryan et al. |
| 7,870,022 B2 | 1/2011 | Bous et al. |
| 7,890,848 B2 | 2/2011 | Bodin et al. |
| 7,900,133 B2 | 3/2011 | Cragun et al. |
| 7,908,628 B2 | 3/2011 | Swart et al. |
| 7,920,112 B2 | 4/2011 | Kurihara et al. |
| 8,018,431 B1 | 9/2011 | Zehr et al. |
| 8,117,128 B2 | 2/2012 | Ishibashi |
| 8,131,647 B2 | 3/2012 | Siegel et al. |
| 8,161,198 B2 | 4/2012 | Kikuchi |
| 8,165,998 B2 | 4/2012 | Semerdzhiev |
| 8,175,925 B1 | 5/2012 | Rouaix |
| 8,209,623 B2 | 6/2012 | Barletta et al. |
| 8,260,915 B1 | 9/2012 | Ashear |
| 8,312,096 B2 | 11/2012 | Cohen et al. |
| 8,341,210 B1 | 12/2012 | Lattyak et al. |
| 8,370,196 B2 | 2/2013 | Choi et al. |
| 8,417,772 B2 | 4/2013 | Lin et al. |
| 8,429,028 B2 | 4/2013 | Hendricks et al. |
| 8,452,797 B1 | 5/2013 | Paleja et al. |
| 8,510,247 B1 | 8/2013 | Kane, Jr. et al. |
| 8,601,084 B2 | 12/2013 | Carlander |
| 8,725,565 B1 | 5/2014 | Ryan |
| 8,793,575 B1 * | 7/2014 | Lattyak et al. ............. 715/273 |
| 2001/0007980 A1 | 7/2001 | Ishibashi et al. |
| 2001/0025302 A1 | 9/2001 | Suzuki et al. |
| 2001/0026287 A1 | 10/2001 | Watanabe |
| 2001/0027450 A1 | 10/2001 | Shinoda et al. |
| 2001/0027478 A1 | 10/2001 | Meier et al. |
| 2001/0036822 A1 | 11/2001 | Mead et al. |
| 2001/0037328 A1 | 11/2001 | Pustejovsky et al. |
| 2001/0039493 A1 | 11/2001 | Pustejovsky et al. |
| 2001/0049623 A1 | 12/2001 | Aggarwal et al. |
| 2001/0050658 A1 | 12/2001 | Adams |
| 2001/0053975 A1 | 12/2001 | Kurihara |
| 2002/0002540 A1 | 1/2002 | DeMello et al. |
| 2002/0010707 A1 | 1/2002 | Chang et al. |
| 2002/0010759 A1 | 1/2002 | Hitson et al. |
| 2002/0012134 A1 | 1/2002 | Calaway |
| 2002/0026443 A1 | 2/2002 | Chang et al. |
| 2002/0035697 A1 | 3/2002 | McCurdy et al. |
| 2002/0046261 A1 | 4/2002 | Iwata et al. |
| 2002/0049717 A1 | 4/2002 | Routtenberg et al. |
| 2002/0054059 A1 | 5/2002 | Schneiderman |
| 2002/0057286 A1 | 5/2002 | Markel et al. |
| 2002/0059415 A1 | 5/2002 | Chang et al. |
| 2002/0069222 A1 | 6/2002 | McNeely |
| 2002/0069312 A1 | 6/2002 | Jones |
| 2002/0087532 A1 | 7/2002 | Barritz et al. |
| 2002/0090934 A1 | 7/2002 | Mitchelmore |
| 2002/0091584 A1 | 7/2002 | Clark et al. |
| 2002/0092031 A1 | 7/2002 | Dudkiewicz et al. |
| 2002/0095468 A1 | 7/2002 | Sakata |
| 2002/0101447 A1 | 8/2002 | Carro |
| 2002/0103809 A1 | 8/2002 | Starzl et al. |
| 2002/0120635 A1 | 8/2002 | Joao |
| 2002/0123336 A1 | 9/2002 | Kamada |
| 2002/0126140 A1 | 9/2002 | Gorbet et al. |
| 2002/0129012 A1 | 9/2002 | Green |
| 2002/0138291 A1 | 9/2002 | Vaidyanathan et al. |
| 2002/0138649 A1 | 9/2002 | Cartmell et al. |
| 2002/0143822 A1 | 10/2002 | Brid et al. |
| 2002/0147724 A1 | 10/2002 | Fries et al. |
| 2002/0165707 A1 | 11/2002 | Call |
| 2002/0184319 A1 | 12/2002 | Willner et al. |
| 2002/0194474 A1 | 12/2002 | Natsuno et al. |
| 2003/0005002 A1 | 1/2003 | Chen et al. |
| 2003/0009459 A1 | 1/2003 | Chastain et al. |
| 2003/0012216 A1 | 1/2003 | Novaes |
| 2003/0018720 A1 | 1/2003 | Chang et al. |
| 2003/0025731 A1 | 2/2003 | Chastain et al. |
| 2003/0028395 A1 | 2/2003 | Rodgers et al. |
| 2003/0040970 A1 | 2/2003 | Miller |
| 2003/0046233 A1 | 3/2003 | Ara et al. |
| 2003/0052928 A1 | 3/2003 | Williams |
| 2003/0058265 A1 | 3/2003 | Robinson et al. |
| 2003/0065642 A1 | 4/2003 | Zee |
| 2003/0069812 A1 | 4/2003 | Yuen et al. |
| 2003/0076513 A1 | 4/2003 | Sugimoto et al. |
| 2003/0090572 A1 | 5/2003 | Belz et al. |
| 2003/0093312 A1 | 5/2003 | Ukita et al. |
| 2003/0093382 A1 | 5/2003 | Himeno et al. |
| 2003/0097354 A1 | 5/2003 | Finlay et al. |
| 2003/0097361 A1 | 5/2003 | Huang et al. |
| 2003/0105679 A1 | 6/2003 | Krishnan et al. |
| 2003/0110503 A1 | 6/2003 | Perkes |
| 2003/0126123 A1 | 7/2003 | Kodama |
| 2003/0129963 A1 | 7/2003 | Nurcahya |
| 2003/0135495 A1 | 7/2003 | Vagnozzi |
| 2003/0152894 A1 | 8/2003 | Townshend |
| 2003/0163399 A1 | 8/2003 | Harper et al. |
| 2003/0164844 A1 | 9/2003 | Kravitz et al. |
| 2003/0182551 A1 | 9/2003 | Frantz et al. |
| 2003/0190145 A1 | 10/2003 | Copperman et al. |
| 2003/0191737 A1 | 10/2003 | Steele et al. |
| 2003/0204496 A1 | 10/2003 | Ray et al. |
| 2003/0212613 A1 | 11/2003 | Sarig |
| 2004/0002943 A1 | 1/2004 | Merrill et al. |
| 2004/0003344 A1 | 1/2004 | Lai et al. |
| 2004/0003398 A1 | 1/2004 | Donian et al. |
| 2004/0015467 A1 | 1/2004 | Fano |
| 2004/0023191 A1 | 2/2004 | Brown et al. |
| 2004/0030686 A1 | 2/2004 | Cardno et al. |
| 2004/0044723 A1 | 3/2004 | Bell et al. |
| 2004/0049743 A1 | 3/2004 | Bogward |
| 2004/0054499 A1 | 3/2004 | Starzyk et al. |
| 2004/0068471 A1 | 4/2004 | Kato |
| 2004/0078273 A1 | 4/2004 | Loeb et al. |
| 2004/0078757 A1 | 4/2004 | Golovchinsky et al. |
| 2004/0098350 A1 | 5/2004 | Labrou et al. |
| 2004/0117189 A1 | 6/2004 | Bennett |
| 2004/0120280 A1 | 6/2004 | Western |
| 2004/0128359 A1 | 7/2004 | Horvitz et al. |
| 2004/0128539 A1 | 7/2004 | Shureih |
| 2004/0139400 A1 | 7/2004 | Allam et al. |
| 2004/0167822 A1 | 8/2004 | Chasen et al. |
| 2004/0201633 A1 | 10/2004 | Barsness et al. |
| 2004/0205457 A1 | 10/2004 | Bent et al. |
| 2004/0210561 A1 | 10/2004 | Shen |
| 2004/0212941 A1 | 10/2004 | Haas et al. |
| 2004/0229194 A1 | 11/2004 | Yang |
| 2004/0237033 A1 | 11/2004 | Woolf et al. |
| 2004/0239703 A1 | 12/2004 | Angelica |
| 2004/0243613 A1 | 12/2004 | Pourheidari |
| 2004/0252692 A1 | 12/2004 | Shim et al. |
| 2004/0254013 A1 | 12/2004 | Quraishi et al. |
| 2004/0254917 A1 | 12/2004 | Brill et al. |
| 2004/0267552 A1 | 12/2004 | Gilliam et al. |
| 2004/0268253 A1 | 12/2004 | DeMello et al. |
| 2005/0021464 A1 | 1/2005 | Lindauer et al. |
| 2005/0022113 A1 | 1/2005 | Hanlon |
| 2005/0044148 A1 | 2/2005 | Son et al. |
| 2005/0044224 A1 | 2/2005 | Jun et al. |
| 2005/0066219 A1 | 3/2005 | Hoffman et al. |
| 2005/0069225 A1 | 3/2005 | Schneider et al. |
| 2005/0069849 A1 | 3/2005 | McKinney et al. |
| 2005/0076012 A1 | 4/2005 | Manber et al. |
| 2005/0088410 A1 | 4/2005 | Chaudhri |
| 2005/0091604 A1 * | 4/2005 | Davis ........................... 715/772 |
| 2005/0097007 A1 | 5/2005 | Alger et al. |
| 2005/0102618 A1 | 5/2005 | Naito |
| 2005/0125222 A1 | 6/2005 | Brown et al. |
| 2005/0132281 A1 | 6/2005 | Pan et al. |
| 2005/0138007 A1 | 6/2005 | Amitay |
| 2005/0138428 A1 | 6/2005 | McAllen et al. |
| 2005/0144221 A1 | 6/2005 | Shin et al. |
| 2005/0144895 A1 | 7/2005 | Grimes et al. |
| 2005/0154601 A1 | 7/2005 | Halpern et al. |
| 2005/0176438 A1 | 8/2005 | Li |
| 2005/0177562 A1 | 8/2005 | Raciborski |

(56) References Cited

U.S. PATENT DOCUMENTS

| | | |
|---|---|---|
| 2005/0177567 A1 | 8/2005 | Hughes et al. |
| 2005/0193330 A1 | 9/2005 | Peters |
| 2005/0195975 A1 | 9/2005 | Kawakita |
| 2005/0198070 A1 | 9/2005 | Lowry |
| 2005/0222977 A1 | 10/2005 | Zhou et al. |
| 2005/0223315 A1 | 10/2005 | Shimizu et al. |
| 2005/0228836 A1 | 10/2005 | Bacastow et al. |
| 2005/0250439 A1 | 11/2005 | Leslie |
| 2005/0256822 A1 | 11/2005 | Hollingsworth |
| 2005/0257261 A1 | 11/2005 | Shraim et al. |
| 2005/0262258 A1 | 11/2005 | Kohno et al. |
| 2005/0289394 A1 | 12/2005 | Arrouye et al. |
| 2006/0004840 A1 | 1/2006 | Senda |
| 2006/0020469 A1 | 1/2006 | Rast |
| 2006/0031316 A1 | 2/2006 | Forstadius |
| 2006/0045470 A1* | 3/2006 | Poslinski et al. ............... 386/68 |
| 2006/0047830 A1 | 3/2006 | Nair et al. |
| 2006/0047844 A1 | 3/2006 | Deng |
| 2006/0048047 A1 | 3/2006 | Tao |
| 2006/0048184 A1 | 3/2006 | Poslinski et al. |
| 2006/0053045 A1 | 3/2006 | Danielson et al. |
| 2006/0057960 A1 | 3/2006 | Tran |
| 2006/0061595 A1 | 3/2006 | Goede et al. |
| 2006/0069697 A1 | 3/2006 | Shraim et al. |
| 2006/0071754 A1 | 4/2006 | Tofts et al. |
| 2006/0075205 A1 | 4/2006 | Martin et al. |
| 2006/0075444 A1 | 4/2006 | Dillen |
| 2006/0077897 A1 | 4/2006 | Kotzin |
| 2006/0080261 A1 | 4/2006 | Christal |
| 2006/0095404 A1 | 5/2006 | Adelman et al. |
| 2006/0098900 A1 | 5/2006 | King et al. |
| 2006/0101328 A1 | 5/2006 | Albornoz et al. |
| 2006/0109242 A1 | 5/2006 | Simpkins |
| 2006/0123053 A1 | 6/2006 | Scannell, Jr. |
| 2006/0129618 A1 | 6/2006 | Maier |
| 2006/0129924 A1 | 6/2006 | Nelson et al. |
| 2006/0143558 A1 | 6/2006 | Albornoz et al. |
| 2006/0145950 A1 | 7/2006 | Tanaka |
| 2006/0156222 A1 | 7/2006 | Chi et al. |
| 2006/0161578 A1 | 7/2006 | Siegel et al. |
| 2006/0161635 A1 | 7/2006 | Lamkin et al. |
| 2006/0175983 A1 | 8/2006 | Crouse et al. |
| 2006/0179137 A1 | 8/2006 | Jennings, III et al. |
| 2006/0190489 A1 | 8/2006 | Vohariwatt et al. |
| 2006/0190568 A1 | 8/2006 | Patterson |
| 2006/0195431 A1 | 8/2006 | Holzgrafe et al. |
| 2006/0209175 A1 | 9/2006 | Cohen et al. |
| 2006/0236240 A1 | 10/2006 | Lebow |
| 2006/0240799 A1 | 10/2006 | Kim et al. |
| 2006/0250994 A1 | 11/2006 | Sasaki et al. |
| 2006/0253441 A1 | 11/2006 | Nelson |
| 2006/0253458 A1 | 11/2006 | Dixon et al. |
| 2006/0253461 A1 | 11/2006 | de Bonet |
| 2006/0256083 A1 | 11/2006 | Rosenberg |
| 2006/0265518 A1 | 11/2006 | Owens et al. |
| 2006/0271629 A1 | 11/2006 | MacDowell |
| 2006/0281058 A1 | 12/2006 | Mangoaela |
| 2006/0282797 A1 | 12/2006 | Barsness et al. |
| 2007/0005616 A1 | 1/2007 | Hay et al. |
| 2007/0005757 A1 | 1/2007 | Finger et al. |
| 2007/0014404 A1 | 1/2007 | Cha |
| 2007/0016555 A1 | 1/2007 | Ito et al. |
| 2007/0025704 A1 | 2/2007 | Tsukazaki et al. |
| 2007/0039023 A1 | 2/2007 | Kataoka |
| 2007/0050346 A1 | 3/2007 | Goel et al. |
| 2007/0055926 A1 | 3/2007 | Christiansen et al. |
| 2007/0061335 A1 | 3/2007 | Ramer et al. |
| 2007/0061337 A1 | 3/2007 | Saito et al. |
| 2007/0061803 A1 | 3/2007 | Barrett |
| 2007/0073596 A1 | 3/2007 | Alexander et al. |
| 2007/0078273 A1 | 4/2007 | Hirota |
| 2007/0079236 A1 | 4/2007 | Schrier et al. |
| 2007/0079383 A1 | 4/2007 | Gopalakrishnan |
| 2007/0094285 A1 | 4/2007 | Agichtein et al. |
| 2007/0094351 A1 | 4/2007 | Kalish et al. |
| 2007/0105536 A1 | 5/2007 | Tingo, Jr. |
| 2007/0112817 A1 | 5/2007 | Danninger |
| 2007/0118533 A1 | 5/2007 | Ramer et al. |
| 2007/0130109 A1 | 6/2007 | King et al. |
| 2007/0136660 A1 | 6/2007 | Gurcan et al. |
| 2007/0136679 A1 | 6/2007 | Yang |
| 2007/0142934 A1 | 6/2007 | Boercsoek et al. |
| 2007/0150456 A1 | 6/2007 | Lian et al. |
| 2007/0162961 A1 | 7/2007 | Tarrance et al. |
| 2007/0174545 A1 | 7/2007 | Okada et al. |
| 2007/0185865 A1 | 8/2007 | Budzik et al. |
| 2007/0189719 A1 | 8/2007 | Furumachi et al. |
| 2007/0219983 A1 | 9/2007 | Fish |
| 2007/0233562 A1 | 10/2007 | Lidwell et al. |
| 2007/0233692 A1 | 10/2007 | Lisa et al. |
| 2007/0234209 A1 | 10/2007 | Williams |
| 2007/0238077 A1 | 10/2007 | Strachar |
| 2007/0240187 A1 | 10/2007 | Beach et al. |
| 2007/0242225 A1 | 10/2007 | Bragg et al. |
| 2007/0250573 A1 | 10/2007 | Rothschild |
| 2007/0282809 A1 | 12/2007 | Hoeber et al. |
| 2007/0283173 A1 | 12/2007 | Webb et al. |
| 2007/0288853 A1 | 12/2007 | Neil |
| 2008/0005097 A1 | 1/2008 | Kleewein et al. |
| 2008/0005203 A1 | 1/2008 | Bots et al. |
| 2008/0005664 A1 | 1/2008 | Chandra |
| 2008/0016064 A1 | 1/2008 | Sareday et al. |
| 2008/0016164 A1 | 1/2008 | Chandra |
| 2008/0027933 A1 | 1/2008 | Hussam |
| 2008/0031595 A1 | 2/2008 | Cho |
| 2008/0040233 A1 | 2/2008 | Wildman et al. |
| 2008/0059702 A1 | 3/2008 | Lu et al. |
| 2008/0066155 A1 | 3/2008 | Abraham |
| 2008/0082518 A1 | 4/2008 | Loftesness |
| 2008/0082911 A1 | 4/2008 | Sorotokin et al. |
| 2008/0089665 A1 | 4/2008 | Thambiratnam et al. |
| 2008/0113614 A1 | 5/2008 | Rosenblatt |
| 2008/0115224 A1 | 5/2008 | Jogand-Coulomb et al. |
| 2008/0120101 A1 | 5/2008 | Johnson et al. |
| 2008/0120280 A1 | 5/2008 | Iijima et al. |
| 2008/0133479 A1 | 6/2008 | Zelevinsky et al. |
| 2008/0154908 A1 | 6/2008 | Datar et al. |
| 2008/0164304 A1 | 7/2008 | Narasimhan et al. |
| 2008/0165141 A1 | 7/2008 | Christie |
| 2008/0168073 A1 | 7/2008 | Siegel et al. |
| 2008/0208833 A1 | 8/2008 | Basmov |
| 2008/0222552 A1 | 9/2008 | Batarseh et al. |
| 2008/0235351 A1 | 9/2008 | Banga et al. |
| 2008/0243788 A1 | 10/2008 | Reztlaff et al. |
| 2008/0243814 A1 | 10/2008 | Gurcan et al. |
| 2008/0243828 A1* | 10/2008 | Reztlaff et al. ................... 707/5 |
| 2008/0259057 A1* | 10/2008 | Brons ........................... 345/184 |
| 2008/0270930 A1* | 10/2008 | Slosar .......................... 715/776 |
| 2008/0163039 A1 | 11/2008 | Nguyen et al. |
| 2008/0293450 A1 | 11/2008 | Ryan et al. |
| 2008/0294674 A1 | 11/2008 | Reztlaff, II et al. |
| 2008/0295039 A1 | 11/2008 | Nguyen et al. |
| 2008/0298083 A1 | 12/2008 | Watson et al. |
| 2008/0301820 A1 | 12/2008 | Stevens |
| 2009/0094528 A1 | 4/2009 | Gray et al. |
| 2009/0094540 A1 | 4/2009 | Gray et al. |
| 2009/0181649 A1 | 7/2009 | Bull et al. |
| 2009/0228774 A1 | 9/2009 | Matheny et al. |
| 2009/0231233 A1 | 9/2009 | Liberatore |
| 2009/0241054 A1 | 9/2009 | Hendricks |
| 2009/0263777 A1 | 10/2009 | Kohn |
| 2009/0267909 A1 | 10/2009 | Chen et al. |
| 2009/0296331 A1 | 12/2009 | Choy |
| 2009/0319482 A1 | 12/2009 | Norlander et al. |
| 2010/0023259 A1 | 1/2010 | Krumm et al. |
| 2010/0081120 A1 | 4/2010 | Nanjiani et al. |
| 2010/0095340 A1 | 4/2010 | Ei et al. |
| 2010/0125876 A1 | 5/2010 | Craner et al. |
| 2010/0131385 A1 | 5/2010 | Harrang et al. |
| 2010/0164888 A1 | 7/2010 | Okumura et al. |
| 2010/0188327 A1 | 7/2010 | Frid et al. |
| 2010/0284036 A1 | 11/2010 | Ahn et al. |
| 2010/0328223 A1 | 12/2010 | Mockarram-Dorri et al. |
| 2011/0050591 A1 | 3/2011 | Kim et al. |

(56) References Cited

U.S. PATENT DOCUMENTS

| | | | |
|---|---|---|---|
| 2011/0050594 A1 | 3/2011 | Kim et al. | |
| 2011/0057884 A1 | 3/2011 | Gormish et al. | |
| 2011/0069073 A1 | 3/2011 | Unger | |
| 2011/0112671 A1 | 5/2011 | Weinstein | |
| 2011/0191710 A1 | 8/2011 | Jang et al. | |
| 2011/0267333 A1 | 11/2011 | Sakamoto et al. | |
| 2011/0295926 A1 | 12/2011 | Battiston et al. | |
| 2012/0001923 A1 | 1/2012 | Weinzimmer et al. | |
| 2012/0016774 A1 | 1/2012 | Dicke et al. | |
| 2012/0036431 A1 | 2/2012 | Ito et al. | |
| 2012/0041941 A1 | 2/2012 | King et al. | |
| 2012/0079372 A1* | 3/2012 | Kandekar et al. | 715/256 |
| 2012/0197998 A1 | 8/2012 | Kessel et al. | |
| 2012/0227001 A1* | 9/2012 | Gupta et al. | 715/763 |
| 2013/0219320 A1 | 8/2013 | Seet et al. | |
| 2013/0246157 A1 | 9/2013 | Puppin et al. | |
| 2014/0218286 A1 | 8/2014 | Kim | |

FOREIGN PATENT DOCUMENTS

| | | |
|---|---|---|
| CN | 101120358 | 2/2008 |
| EP | 1197902 | 4/2002 |
| JP | 6274493 A | 9/1994 |
| JP | 07078139 | 3/1995 |
| JP | 09179870 | 7/1997 |
| JP | 10091640 | 4/1998 |
| JP | 11074882 | 3/1999 |
| JP | 2000501214 | 2/2000 |
| JP | 2001052016 | 2/2001 |
| JP | 2001052025 | 2/2001 |
| JP | 201100702 A | 4/2001 |
| JP | 2001195412 | 7/2001 |
| JP | 2001236358 | 8/2001 |
| JP | 2002099739 A | 4/2002 |
| JP | 2002197079 A | 7/2002 |
| JP | 2002259718 | 9/2002 |
| JP | 2002536736 | 10/2002 |
| JP | 2003016104 | 1/2003 |
| JP | 2003122969 | 4/2003 |
| JP | 2003513384 | 4/2003 |
| JP | 2003516585 | 5/2003 |
| JP | 2003517158 | 5/2003 |
| JP | 2003186910 | 7/2003 |
| JP | 2005056041 | 3/2005 |
| JP | 2006011694 | 1/2006 |
| JP | 2006107496 | 4/2006 |
| JP | 2006129323 | 5/2006 |
| JP | 2006190114 | 7/2006 |
| JP | 2008071334 | 3/2008 |
| JP | 2008516297 | 5/2008 |
| JP | 2008527580 | 7/2008 |
| JP | 2008197634 | 8/2008 |
| KR | 1020020020262 | 3/2002 |
| WO | WO97/20274 | 6/1997 |
| WO | WO9720274 | 6/1997 |
| WO | WO00/45588 | 8/2000 |
| WO | WO0045588 | 8/2000 |
| WO | WO0075840 A2 | 12/2000 |
| WO | WO01/42978 | 6/2001 |
| WO | WO0239206 | 5/2002 |
| WO | WO2004055647 A2 | 7/2004 |
| WO | WO2006078728 A2 | 7/2006 |

OTHER PUBLICATIONS

Final Office Action from the U.S. Patent and Trademark Office for U.S. Appl. No. 12/414,914, mailed on Jan. 4, 2012, 16 pgs.
Office action for U.S. Appl. No. 11/693,685, mailed on Aug. 15, 2013, Lattyak et al., "Relative Progress and Event Indicators", 24 pages.
The Japanese Office Action mailed Aug. 23, 2013 for Japanese patent application No. 2009-544304, a counterpart foreign application of US patent No. 7,865,817, 4 pages.
Office Action for U.S. Appl. No. 12/943,211, mailed on Oct. 8, 2013, "Obtaining and Verifying Search Indices", 9 pages.
Office action for U.S. Appl. No. 11/763,376, mailed on Aug. 19, 2013, Kiraly et al., "Notification of a User Device to Perform an Action", 16 pages.
Office action for U.S. Appl. No. 11/537,484, mailed on Aug. 27, 2013, Ryan, "Expedited Acquisition of a Digital Item Following a Sample Presentation of the Item", 13 pages.
Office action for U.S. Appl. No. 12/414,914, mailed on Sep. 13, 2013, Agarwal et al, "Questions on Highlighted Passages", 35 pages.
Final Office Action for U.S. Appl. No. 11/763,369, mailed on Sep. 16, 2013, James R. Reztlaff II et al., "Search of Multiple Content Sources on a User Device", 23 pages.
Office Action for U.S. Appl. No. 13/294,803, mailed on Sep. 24, 2013, John Lattyak, "Progress Indication for a Digital Work", 27 pages.
Office action for U.S. Appl. No. 13/722,961, mailed on Sep. 5, 2013, Lattyak et al., "Delivery of Items for Consumption by a User Device", 6 pages.
US Pat. Pub. No. 2004081300 dated Apr. 29, 2004, corresponds to Japanese Patent Application Laid-open No. 2002-259718, 14 pages.
US Patent No. 7,340,436 dated Mar. 4, 2008, corresponds to Japanese Patent Application Laid-open No. 2003-513384, 7 pages.
Office action for U.S. Appl. No. 13/294,803, mailed on Feb. 21, 2013, Inventor #1, "Progress Indication for a Digital Work", 76 pages.
Office action for U.S. Appl. No. 11/763,386, mailed on Feb. 28, 2013, Ryan et al., "Handling of Subscription-Related Issues in a Media Consumption System", 17 pages.
Office action for U.S. Appl. No. 12/360,089, mailed on Mar. 5, 2013, Killalea et al., "Aggregation of Highlights", 17 pages.
Office action for U.S. Appl. No. 11/763,390, mailed on Apr. 8, 2013, Bajaj et al, "Providing User-Supplied Items to a User Device", 7 pages.
Oki et al., "The Infomation Bus—An Architecture for Extensive Distributed Systems", ACM, 1993, 11 pages.
Palm Reader Handbook, Palm Inc., 2000, 56 pages.
The Chinese Office Action mailed Dec. 13, 2012 for Chinese patent application No. 20078004873.9, a counterpart foreign application of US patent No. 7,865,817, 4 pages.
The Chinese Office Action mailed Dec. 14, 2012 for Chinese patent application No. 200880017589.9, a counterpart foreign application of U.S. Appl. No. 11/763,369, 8 pages.
The Chinese Office Aciton mailed Feb. 1, 2013 for Chinese patent application No. 200880025056.5, a counterpart foreign application of U.S. Appl. No. 11/763,374, 19 pages.
The Japanese Office Action mailed Dec. 17, 2012 for Japanese patent application No. 2010-509529, a counterpart foreign application of U.S. Appl. No. 11/763,374, 7 pages.
The Japanese Office Action mailed Dec. 7, 2012 for Japanese patent application No. 2010-501124, a counterpart foreign application of U.S. Appl. No. 11/693,682, 6 pages.
Office action for U.S. Appl. No. 12/943,211, mailed on Feb. 6, 2013, Reztlaff, II et al., "Obtaining and Verifying Search Indices", 9 pages.
Office action for U.S. Appl. No. 11/763,392, mailed on Feb. 14, 2013, Ryan et al., "Administrative Tasks in a Media Consumption System", 47 pages.
Canadian Office Action mailed Jul. 6, 2012 for Canadian patent application No. 2594573, a counterpart foreign application of US patent application No. 8,131,647, 5 pages.
The Chinese Office Action mailed May 17, 2012 for Chinese patent application No. 20078004873.9, a counterpart foreign application of US patent No. 7,865,817, 5 pages.
The Chinese Office Action mailed May 21, 2012 for Chinese patent application No. 200880017589.9, a counterpart foreign application of U.S. Appl. No. 11/763,369, 9 pages.
Final Office Action from the U.S. Patent and Trademark Office for Application U.S. Appl. No. 11/763,378, mailed on Mar. 16, 2010, 16 pgs.
Office Action from the U.S. Patent and Trademark Office for U.S. Appl. No. 11/763,375, mailed on Jan. 19, 2010, 31 pgs.
Office Action from the U.S. Patent and Trademark Office for U.S. Appl. No. 11/763,378, mailed on Oct. 15, 2009, 31 pgs.

(56) References Cited

OTHER PUBLICATIONS

Office Action from the U.S. Patent and Trademark Office for U.S. Appl. No. 11/763,375, mailed on Aug. 6, 2010, 17 pgs.
Non-Final Office Action for U.S. Appl. No. 13/083,445, mailed on May 4, 2012, Hilliard B. Siegel et al., "Method and System for Providing Annotations of a Digital Work", 20 pages.
Final Office Action for U.S. Appl. No. 11/763,395, mailed May 9, 2012, Thomas Ryan et al., "Providing Supplemental Information Based on Hints in a Media Consumption System", 12 pages.
Office action for U.S. Appl. No. 11/763,390, mailed on Jun. 27, 2012, Bajaj et al., "Providing User-Supplied Items to a User Device", 7 pages.
Office action for U.S. Appl. No. 11/763,392, mailed on Jun. 27, 2012, Ryan et al., "Administrative Tasks in a Media Consumption System", 47 pages.
Non-Final Office Action for U.S. Appl. No. 12/943,211, mailed on Jun. 6, 2012, James. R. Retzlaff II et al., "Obtaining and Verifying Search Indices", 10 pages.
Non-Final Office Action for U.S. Appl. No. 11/763,369 mailed on Jun. 7, 2012, James R. Reztlaff II et al., "Search of Multiple Content Sources on a User Device", 20 pages.
The Chinese Office Action mailed Nov. 5, 2013 for Chinese patent application No. 200880025056.5, a counterpart foreign application of U.S. Appl. No. 11/763,374, 15 pages.
Final Office Action for U.S. Appl. No. 11/763,395, mailed on Oct. 30, 2013, Thomas A. Ryan, "Providing Supplemental Information Based on Hints in a Media Consumption System", 14 pages.
The Japanese Office Action mailed Nov. 12, 2013 for Japanese patent application No. 2010-501125, a counterpart foreign application of U.S. Appl. No. 11/763,369, 9 pages.
"Mastering to Become a True Manager, Well-selected commands for an efficient event log management, Part 1," Windows Server World, vol. 9, No. 2, pp. 86-96, IDG Japan, Japan, Feb. 1, 2004.
Office action for U.S. Appl. No. 11/763,386, mailed on Oct. 16, 2013, Ryan et al., "Handling of Subscription-Related Issues in a Media Consumption System ",18 pages.
Office Action for U.S. Appl. No. 12/759,828, mailed on Dec. 17, 2013, James R. Retzlaff II, "Search and Indexing on a User Device", 25 pages.
Goodreads.com, "About goodreads", 2006, 2 pages.
The Japanese Office Action mailed Apr. 12, 2013 for Japanese patent application No. 2010-501125, a counterpart foreign application of U.S. Appl. No. 11/763,369, 5 pages.
Office action for U.S. Appl. No. 11/763,374, mailed on Apr. 22, 2013, Ryan et al., "Consumption of Items via a User Device", 17 pages.
Office action for U.S. Appl. No. 11/763,369, mailed on May 14, 2013, Reztlaff, II et al., "Search of Multiple Content Sources on a User Device", 24 pages.
Office action for U.S. Appl. No. 11/763,395, mailed on May 2, 2013,Ryan et al., "Providing Supplemental Information Based on Hints in a Media Consumption System", 12 pages.
Office action for U.S. Appl. No. 13/294,803, mailed on Jun. 4, 2013, Lattyak et al., "Progress Indication for a Digital Work", 26 pages.
Office action for U.S. Appl. No. 12/759,828, mailed on Jun. 6, 2013, Reztlaff, II et al., "Search and Indexing on a User Device", 27 pages.
International Search Report mailed Sep. 9, 2008, in International Application No. PCT/US08/64387, filed May 21, 2008, 1 page.
The Chinese Office Action mailed Jun. 6, 2013 for Chinese patent application No. 201080006308.7, a counterpart foreign application of US patent No. 8,378,979, 13 pages.
The Chinese Office Action mailed Jun. 28, 2013 for Chinese patent application No. 20078004873.9, a counterpart foreign application of US patent application No. 7,865,817, 4 pages.
The Chinese Office Action mailed Jul. 10, 2013 for Chinese patent application No. 200880025056.5, a counterpart foreign application of U.S. Appl. No. 11/763,374, 8 pages.
The European Office Action mailed Jun. 10, 2013 for European patent application No. 06718773.2, a counterpart foreign application of U.S. Appl. No. 11/693,682, 6 pages.

The Japanese Office Action mailed May 24, 2013 for Japanese patent application No. 2010-501124, a counterpart foreign application of U.S. Appl. No. 11/693,682, 7 pages.
The Japanese Office Action mailed May 31, 2013 for Japanese patent application No. 2010-509529, a counterpart foreign application of U.S. Appl. No. 11/763,374, 5 pages.
Office action for U.S. Appl. No. 12/360,089, mailed on Jul. 3, 2013, Killalea et al., "Aggregation of Highlights", 14 pages.
The Chinese Office Action mailed Sep. 24, 2012 for Chinese patent application No. 200880017259.X, a counterpart foreign application of U.S. Appl. No. 11/693,682, 5 pages.
The Japanese Office mailed Oct. 12, 2012 for Japanese patent application No. 2009-544304, a counterpart foreign application of US patent No. 7,865,817, 6 pages.
The Japanese Office Action mailed Sep. 18, 2012 for Japanese patent application No. 2007-552235, a counterpart foreign application of US patent No. 8,131,647, 4 pages.
Office action for U.S. Appl. No. 11/763,374 mailed on Oct. 16, 2012, Ryan et al, "Consumption of Items via a User Device", 13 pages.
Office action for U.S. Appl. No. 13/083,445, mailed on Oct. 5, 2012, Siegel et al., "Method and System for Providing Annotations of a Digital Work", 29 pages.
Office action for U.S. Appl. No. 12/360,089, mailed on Nov. 23, 2012, Killalea et al., "Aggregation of Highlights", 15 pages.
The Chinese Office Action mailed Feb. 25, 2014 for Chinese patent application No. 200880025056.5 , a counterpart foreign application of U.S. Appl. No. 11/763,374, 13 pages.
Homer, et al., "Instant HTML", Wrox Press, 1997, pp. 76-79.
Office Action for U.S. Appl. No. 11/763,314, mailed on Mar. 10, 2014, Craig S. Griffin, "Display Dependent Markup Language", 42 pages.
Office action for U.S. Appl. No. 12/366,941, mailed on Mar. 14, 2014, Dixon et al., "Bundled Digital Content", 13 pages.
Final Office Action for U.S. Appl. No. 11/693,685, mailed on Mar. 24, 2014, John Lattyak, "Relative Progress and Event Indicators", 26 pages.
Office Action for U.S. Appl. No. 11/763,357, mailed on Mar. 27, 2014, James R. Retzlaff II, "Obtaining and Verifying Search Indices", 14 pages.
The Chinese Office Action mailed Jan. 6, 2014 for Chinese patent application No. 201080006308.7, a counterpart foreign application of US patent No. 8,378,979, 12 pages.
Final Office Action for U.S. Appl. No. 12/360,089, mailed on Jan. 28, 2014, Tom Killalea, "Aggregation of Highlights", 14 pages.
Final Office Action for U.S. Appl. No. 12/414,914, mailed on Feb. 10, 2014, Amit D. Agarwal, "Questions on Highlighted Passages", 40 pages.
The Japanese Office Action mailed Jan. 14, 2014 for Japanese patent application No. 2011-548210, a counterpart foreign application of US patent No. 8,378,979, 14 pages.
Office Action for U.S. Appl. No. 11/763,374, mailed on Dec. 24, 2013, Thomas A. Ryan, "Consumption of Items via a User Device", 16 pages.
Office Action for U.S. Appl. No. 11/537,518, mailed on Feb. 14, 2014, John Lattyak, "Acquisition of an Item Based on a Catalog Presentation of Items", 14 pages.
"Trilogy Definition", Merriam-Webster's Collegiate Dictionary, Tenth Edition, 1999, 2 pages.
U.S. Appl. No. 11/277,894, filed Mar. 29, 2006, Jateen P. Parekh, Gregg E. Zehr, and Subram Narasimhan,"Reader Device Content Indexing".
U.S. Appl. No. 11/537,484, filed Sep. 29, 2006, Thomas Ryan, "Expedited Acquisition of a Digital Item Following a Sample Presentation of the Item."
U.S. Appl. No. 11/537,518, filed Sep. 29, 2006, John Lattyak, "Acquisition of an Item based on a Catalog Presentation of Items."
U.S. Appl. No. 11/693,685, filed Mar. 29, 2007, John Lattyak; John Kim; Steven Moy; Laurent An Minh Nguyen, "Relative Progress and Event Indicators."
U.S. Appl. No. 11/763,314, filed Jun. 14, 2007, John Lattyak; Craig Griffin; Steven Weiss, "Display Dependent Markup Language."

(56) References Cited

OTHER PUBLICATIONS

U.S. Appl. No. 11/763,339, filed Jun. 14, 2007, David Isbister; Marshall Wililams; Nicholas Vaccaro, "Power Management Techniques for a User Device."
U.S. Appl. No. 11/763,357, filed Jun. 14, 2007, James Reztlaff II; John Lattyak, "Obtaining and Verifying Search Indices."
U.S. Appl. No. 11/763,363, filed Jun. 14, 2007, James Reztlaff II; Thomas Ryan, "Search Results Generation and Sorting."
U.S. Appl. No. 11/763,375, filed Jun. 14, 2007, John Lattyak, Girish Bansil Bajaj, Kevin R. Cheung, Thomas Fruchterman, Robert L. Goodwin, Kenneth P. Kiraly, Richard Moore, Subram Narasimhan, Thomas A. Ryan, Michael V. Rykov, Jon Saxton, James C. Slezak, Beryl Tomay, Aviram Zagorie, Gregg Elliott Zehr, "Delivery of Items for Consumption by a User Device."
U.S. Appl. No. 11/763,376, filed Jun. 14, 2007, Kenneth Kiraly; Thomas Ryan; Gregg Zehr; John Lattyak; Michael Rykov; Girish Bansilal Bajaj; James Slezak; Aviram Zagorie; Richard Moore; Kevin Cheung; Thomas Fruchterman; Robert Goodwin, "Notification of a User Device to Perform an Action."
U.S. Appl. No. 11/763,378, filed Jun. 14, 2007, John Lattyak; Thomas Ryan; Gregg Zehr; Kenneth Kiraly; Michael Rykov; Girish Bansilal Bajaj; James Slezak; Aviram Zagorie; Richard Moore; Kevin Cheung; Thomas Fruchterman; Robert Goodwin; Xiaotian Guo, "Transfer of Instructions to a User Device."
U.S. Appl. No. 11/763,381, filed Jun. 14, 2007, Michael Rykov; Girish Bansilal Bajaj; James Slezak; Aviram Zagorie; Richard Moore; Kevin Cheung; Thomas Fruchterman; Robert Goodwin, "Selecting and Providing Items in a Media Consumption System."
U.S. Appl. No. 11/763,386, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin, "Handling of Subscription-Related Issues in a Media Consumption System."
U.S. Appl. No. 11/763,390, filed Jun. 14, 2007, Girish Bansilal Bajaj; Michael Rykov; James Slezak; Aviram Zagorie; Richard Moore; Kevin Cheung; Thomas Fruchterman; Robert Goodwin,, "Providing User-Supplied Items to a User Device."
U.S. Appl. No. 11/763,392, filed Jun. 14, 2007, Thomas Ryan; Gregg Zehr; Kenneth Kiraly; John Lattyak; Subram Narasimhan; Michael Rykov; Girish Bansilal Bajaj; James Slezak; Aviram Zagorie; Richard Moore; Kevin Cheung; Thomas Fruchterman; Robert Goodwin, "Administrative Tasks in a Media Consumption System ."
U.S. Appl. No. 11/763,393, filed Jun. 14, 2007, John Lattyak; Michael Rykov; Girish Bansilal Bajaj; James Slezak; Aviram Zagorie; Richard Moore; Kevin Cheung; Thomas Fruchterman; Robert Goodwin,, "Incremental Updates of Items ."
U.S. Appl. No. 11/763,395, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin; James Reztlaff II, "Providing Supplemental Information Based on Hints in a Media Consumption System ."
U.S. Appl. No. 11/963,618, filed Dec. 21, 2007, Michael Rykov; Laurent An Minh Nguyen; Steven Moy, "Dissemination of Periodical Samples."
U.S. Appl. No. 12/333,215, filed Dec. 11, 2008, Aviram Zagorie; Craig Griffin; John Lattyak; Michael Rykov, "Device-Specific Presentation Control for Electronic Book Reader Devices."
U.S. Appl. No. 12/351,629, filed Jan. 9, 2009, John Johnston; Weiping Dou; Steven Chase, "Antenna Placement on Portable Device ."
U.S. Appl. No. 12/351,663, filed Jan. 9, 2009, Chris Li; Steven Chase, "Surface Mount Clip for Routing and Grounding Cables."
U.S. Appl. No. 12/360,089, filed Jan. 26, 2009, Thomas Dimson, Janna Hamaker, Eugene Kalenkovich, Tom Killalea, "Aggregation of Highlights."
U.S. Appl. No. 12/360,744, filed Jan. 27, 2009, Rajiv Kotesh Ghanta; Marcos Frid; Joseph J. Hebenstreit; John T. Kim, "Electronic Device With Haptic Feedback."
U.S. Appl. No. 12/366,941, filed Feb. 6, 2009, Scott Dixon; Eriel Thomas, "Bundled Digital Content."
U.S. Appl. No. 12/414,914, filed Mar. 31, 2009, Amit Agarwal; Zaur Kambarov; Tom Killalea, "Questions on Highlighted Passages."
U.S. Appl. No. 29/331,528, filed Jan. 27, 2009, Chris Green, "User Interface Cluster."
"A Universally Unique IDentifier (UUID) URN Namespace", Jul. 2005, IETF, all pages. Retrieved on Apr. 21, 2010 at http://tools.ietf.org/pdf/rfc4122.pdf.
"Annotator Instructions," Berkman Center for Internet & Society at Harvard Law School <<http://cyber.law.harvard.edu/annotate/instructions.html>>, also found at <<http://cyber.law.harvard.edu/cite/instructions.html>>, [Retrieved Jan. 30, 2004], 1 page.
"Annotator Wishlist," Berkman Center for Internet & Society at Harvard Law School <http://cyber.law.harvard.edulcite/annotate.cgi ?action=print&markup ;center=; view=http%3A%2F%2Fcy > [Retrieved Jan. 30, 2004], 1 page.
BarnesandNoble.com, "Barnes and Noble Homepage", retrieved on Aug. 2, 2011 http://web.archive.org/web/19981202183957/http://www.barnesandnoble.com/, Dec. 2, 1998.
Beigbeder et al., "An Information Retrieval Model Using the Fuzzy Proximity Degree of Term Occurences", 2005 ACM Symposium on Applied Computing, pp. 1018-pp. 1022.
Bellwood, et al., "UDDI Version 2.04 API Specification UDDI Committee Specification, Jul. 19, 2002", Oasis, all pages. Retrieved on Apr. 21, 2010 via Wayback Machine at http://web.archive.org/web/20050314033213/www.oasis-open.org/committees/uddi-spec/doc/tcspecs.htm.
Roscheisen, M., et al., "Beyond Browsing: Shared Comments, SOAPs, Trails, and On-Line Communities," Computer Networks and ISDN Systems 27:739-749, 1995.
Biskup, J., et al, "Towards a Credential-Based Implementation of Compound Access Control Policies" SACMAT '04, Proceedings of the ninth ACM symposium on Access control models and technologies, Jun. 4, 2004, NY, retrieved from the internet: http://portal.acm.org/citation.cfm?id=990036.990042 (retrieved Nov. 9, 2010.
Bradley, "Plastic Shape Shifter", retreived on May 7, 2009 at <<http://www.reactivereports.com/61/61_3.html>>, Chemistry WebMagazine, Issue No. 61, Dec. 2006, 2 pgs.
Breu, M. et al., "The Medoc Distrubuted Electronic Library: Accounting and Security Aspects", Electronic Publishing, New Models and Opportunities, Proceedings of an ICCC/IFIP Conference, Apr. 14, 1997, pp. 237-249.
Canadian Office Action mailed Apr. 14, 2009 for Canadian Patent Application No. 2594573, a counterpart foreign application of U.S. Appl. No. 11/039,645, 3 pages.
Cafesoft.com, "Security Glossary", dated Oct. 13, 2003, retrieved from the Wayback Machine on Jul. 2, 2009 at <<http://web.archive.org/web/20031013022218/http://cafesoft.com/support/security-glossary.html>>.
Card et al., "3Book: A 3D Electronic Smart Book", AVI'04 May 25-28, 2004, Hallipoli, Italy, ACM 2004, pp. 303-pp. 307.
Cavanaugh "EBooks and Accommodations", Teaching Expectional Children vol. 35 No. 2 p. 56-61 Copyright 2002 CEC.
Cavanaugh, "EBooks and Accommodations", Teaching Exceptional Children, vol. 35, No. 2, Copyright 2002 CEC, 6 pages.
Chi et al. "eBooks with Indexes that Reorganize Conceptually", CHI2004, Apr. 24-29, 2004, Vienna, Austria ACM 1-58113-703-6/04/0004.
Cleveland, Jr. et al., "Questions and Answers about Biological Effects and Potential Hazards of Radiofrequency Electromagnetic Fields" OET Bulletin 56, Fourth Edition, Aug. 1999, 38 pages.
Cleveland, Jr., et al, "Evaluating Compliance with FCC Guidelines for Human Exposure to Radiofrequency Electromagnetic Fields" OET Bulletin 65, Edition 97-01, Aug. 1997, 84 pages.
The Chinese Office Action mailed May 9, 2008 for Chinese Patent Application No. 200680002606.2, a counterpart foreign application of U.S. Appl. No. 11/039,645, 22 pages.
The Chinese Second Office Action mailed Jun. 5, 2009 for Chinese Patent Application No. 200680002606.2, a counterpart foreign application of U.S. Appl. No. 11/039,645, 20 pages.
The Chinese Third Office Action mailed Nov. 27, 2009 for Chinese Patent Application No. 200680002606.2, a counterpart foreign application of U.S. Appl. No. 11/039,645, 15 pages.

(56) References Cited

OTHER PUBLICATIONS

The Chinese Office Action mailed Oct. 10, 2011 for Chinese patent application No. 200880017259.X, a counterpart foreign application of U.S. Appl. No. 11/693,682, 7 pages.
The Chinese Office Action mailed Jul. 14, 2011 for Japanese patent application No. 20078004873.9, a counterpart foreign application of US patent No. 7,865,817, 6 pages.
Chinese Office Action mailed Aug. 25, 2011 for Chinese patent application No. 200880024964.2, a counterpart foreign application of U.S. Appl. No. 11/763,358, 6 pages.
Chinese Office Action mailed Sep. 26, 2011 for Chinese patent application No. 200880017589.9, a counterpart foreign application of U.S. Appl. No. 11/763,369, 9 pages.
The Chinese Office Action mailed Sep. 30, 2011 for Chinese patent application No. 200880025056.5, a counterpart foreign application of U.S. Appl. No. 11/763,374, 9 pages.
Davison et al. "The Use of eBooks and Interactive Multimedia, as Alternative Forms of Technical Documentation" SIGDOC'05, Sep. 21-23, 2005, Conventry, United Kingdom, Copyright 2005 ACM 1-59593-175-9/5/0009.
Desmoulins et al., "Pattern-Based Annotations on E-books: From Personal to Shared Didactic Content", Proceedings of the IEEE International Workshop on Wireless adn Mobile Techniques in Education, 2002, 4 pages.
Carter, S., et al., "Digital Graffiti: Public Annotation of Multimedia Content," Proceedings o/the CHI2004, Vienna, Austria, Apr. 24-29, 2004, pp. 1207-1210.
Elspass, et al., "Portable Haptic Interface with Active Functional Design", In Proceedings SPIE Conference on Smart Structures and Integrated Systems, Newport Beach, California, vol. 3668, Mar. 1999, 926-932.
Extended European Search Report mailed Dec. 22, 2009, issued in corresponding European Patent Application No. EP 06 71 8773.2, filed Jan. 18, 2006, 9 pages.
The European Office Action mailed Dec. 12, 2009 for European Patent Application No. 06718773.2, a counterpart foreign application of U.S. Appl. No. 11/039,645, 9 pages.
The European Office Action mailed Mar. 26, 20010 for European Patent Application No. 06718773.2, a counterpart foreign application of U.S. Appl. No. 11/039,645.
The European Search report mailed Dec. 22, 2009 for European Patent Application No. 06718773.2, a counterpart foreign application of U.S. Appl. No. 11/039,645, 9 pages.
Office Action from the U.S. Patent and Trademark Office for U.S. Appl. No. 11/763,375, mailed Feb. 23, 2010, 15 pages.
Final Office Action for U.S. Appl. No. 11/763,358, mailed on Apr. 5, 2011, James R. Retzlaff II, "Managing Status of Search Index Generation".
Gladney, H. M.: "Access Control for Large Collections", NY, vol. 15, No. 2, Apr. 1, 1997, pp. 154-194.
"Haptic History—Machine Haptics (Expansion)" retrieved on May 7, 2009 at <<http://hapticshistory.chc61.uci.cu/haptic/site/pages/Machine-Haptics-Became_5.php.>> from Google's cache, text-only version as webpage appeared on Apr. 16, 2009, 8 pgs.
Henke, H. "Survey on Electronic Book Features", Open eBook Forum, online, Mar. 20, 2002, pp. 1-14, retrieved from the Internet: <http://www.openebook.org/doc_library/surveys/IDPF_eBook_Features_2002.pdf> retrieved Nov. 8, 2010.
Jones, et al., "Development of a Tactile Vest", IEEE Computer Society, In the Proceedings of the 12th International Symposium on Haptic Interfaces for Virtual Environment and Teleoperator Systems, Mar. 27-28, 2004, pp. 82-89.
The Japanese Office Action mailed Jan. 25, 2011 for Japanese Patent Application No. 2007-552235, a counterpart foreign application of U.S. Appl. No. 11/039,645, 6 pages.
The Japanese Office Action mailed Oct. 25, 2011 for Japanese patent application No. 2007-552235, a counterpart foreign application of U.S. Appl. No. 11/039,645, 3 pages.

Leach et al, "A Universally Unique IDentifier (UUID) URN Namespace", Jul. 2005, IETF, retrieved on Apr. 21, 2010 at http://tools.ietf.org/pdf/rfc4122.pdf, 32 pgs.
Leutwyler, "Shape-shifting Polymer Gels", retrieved on May 7, 2009 at <<http://www.scientificamerican.com/article.cfm?id=shape-shifting-polymer-ge&print=true>>, Scientific American, Nov. 9, 2000, 1 pg.
Means, et al., "Evaluating Compliance with FCC Guidelines for Human Exposure to Radiofrequency Electromagnetic Fields", OET Bulletin 65 Edition 97-01, Jun. 2001, 57 pages.
Mercier et al., "Sphere of influence Model in Information retrieval", IEEE 2005 International Conference on Fuzzy Systems, pp. 120-pp. 125.
Nakatani, et al., "3D Form Display with Shape Memory Alloy", In Proceedings of 13th International Conference on Artificial Reality and Teleexistence (ICAT), 2003, pp. 179-184.
Navarro, et al., "Modern Information Retrieval, Chapter 8: Indexing and Searching", Jan. 1, 1999, Modern Information Retrieval, ACM Press, New York, pp. 191-228.
Final Office Action for U.S. Appl. No. 11/537,484, mailed on Jan. 24, 2012, Thomas A. Ryan, "Expedited Acquisition of a Digital Item Following a Sample Presentation of the Item", 22 pages.
Final Office Action for U.S. Appl. No. 12/414,914, mailed on Jan. 4, 2012, Agarwal et al., "Questions on Highlighted Passages", 41 pages.
Office action for U.S. Appl. No. 12/360,089, mailed on Oct. 5, 2011, Killalea et al., "Aggregation of Highlights", 75 pages.
Final Office Action for U.S. Appl. No. 11/763,392, mailed on Oct. 14, 2011, Thomas Ryan, "Administrative Tasks in a Media Consumption System", 38 pages.
Office action for U.S. Appl. No. 11/763,390, mailed on Oct. 24, 2011, Bajaj et al., "Providing User-Supplied Items to a User Device", 11 pages.
Final Office Action for U.S. Appl. No. 12/759,828, mailed on Nov. 10, 2011, James R. Retzalff II, "Search and Indexing on a User Device", 16 pages.
Final Office Action for U.S. Appl. No. 11/537,518, mailed on Nov. 25, 2011, John Lattyak, "Acquisition of an Item Based on a Catalog Presentation of Items," 8 pages.
Non-Final Office Action for U.S. Appl. No. 11/763,386, mailed on Nov. 8, 2011, Thomas Ryan, "Handling of Subscription-Related Issues in a Media Consumption System", 10 pages.
Non-Final Office Action for U.S. Appl. No. 11/763,395, Thomas Ryan, "Providing Supplemental Information Based on Hints in a Media Consumption System", 10 pages.
Office action for U.S. Appl. No. 11/763,357, mailed on Dec. 21, 2011, Reztlaff et al., "Obtaining and Verifying Search Indices", 14 pages.
Final Office Action for U.S. Appl. No. 11/763,363, mailed on Dec. 23, 2011, James R. Rezlaff II et al., "Search Results Generation and Sorting", 10 pages.
Non-Final Office Action for U.S. Appl. No. 11/763,369, mailed on Dec. 29, 2011, James R. Reztlaff II et al., "Search of Multiple Content Sources on a User Device", 21 pages.
Final Office Action for U.S. Appl. No. 11/693,685, dated Dec. 8, 2011, John Lattyak et al., "Relative Progress and Event Indicators", 23 pages.
Final Office Action for U.S. Appl. No. 11/763,374, mailed on Feb. 13, 2012, Thomas Ryan et al., "Consumption of Items via a User Device", 14 pages.
Non-Final Office Action for U.S. Appl. No. 11/763,393, mailed on Feb. 16, 2012, John Lattyak et al., "Incremental Updates of Items", 24 pages.
Non-Final Office Action for U.S. Appl. No. 11/537,518, mailed on Apr. 28, 2011, John Lattyak, "Acquisition of an Item Based on a Catalog Presentation of Items" 26 pages.
Office action for U.S. Appl. No. 11/763,357, mailed on May 26, 2011, Reztlaff, "Obtaining and Verifying Search Indices".
Final Office Action for U.S. Appl. No. 11/763,314, mailed on Jun. 13, 2011, Craig S. Griffin, "Display Dependent Markup Language".
Non-Final Office Action for U.S. Appl. No. 11/693,682, mailed on Jun. 9, 2011, Hilliard B. Siegel, "Providing Annotations of a Digital Work".

(56) References Cited

OTHER PUBLICATIONS

Office action for U.S. Appl. No. 12/333,215, mailed on Jul. 18, 2011, Zagorie et al., "Device-Specific Presentation Control for Electronic Book Reader Devices", 22 pages.
Non-Final Office Action for U.S. Appl. No. 11/693,685, John Lattyak, "Relative Progress and Event Indicators".
Office action for U.S. Appl. No. 12/414,914, mailed on Aug. 4, 2011, Agarwal et al., "Questions on Highlighted Passages", 39 pages.
Non-final Office Action for U.S. Appl. No. 11/537,484, mailed on Aug. 19, 2011, Thomas A. Ryan, "Expedited Acquisition of a Digital Item Following a Sample Presentation of the Item", 13 pages.
Non-final Office Action for U.S. Appl. No. 11/763,363, mailed on Aug. 26, 2011, James R. Rezlaff II, "Search Results Generation and Sorting", 10 pages.
Non-Final Office Action for U.S. Appl. No. 11/763,358, mailed on Sep. 12, 2011, James R. Retzlaff II, "Managing Status of Search Index Generation", 11 pages.
Final Office Action for U.S. Appl. No. 11/963,618, mailed on Sep. 26, 2011, Michael Rykov, "Dissemination of Periodical Samples", 15 pages.
Non-Final Office Action for U.S. Appl. No. 11/763,374, mailed on Sep. 27, 2011, Thomas Ryan, "Consumption of Items via a User Device", 17 pages.
OQO "A Full PC That Fits in Your Pocket" Retrieved on Sep. 22, 2008 at <<http://www.oqo.com/support/documentation.html>>.
International Search Report mailed Sep. 9, 2008, in International Application No. PCT/US/08/64387, filed May 21, 2008, 1 page.
International Search Report mailed Aug. 15, 2008, in International Application No. PCT/US07/89105, filed Dec. 28, 2007, 2 pages.
International Search Report mailed Aug. 15, 2008, in corresponding International Application No. PCT/US08/57829, filed Mar. 21, 2008, 1 page.
International Search Report mailed Jul. 7, 2008, in International Application No. PCT/US08/57848, filed Mar. 31, 2008, 2 pages.
PCT International Search Report and the Written Opinion for Application No. PCT/US 08/64389, mailed on Jan. 28, 2009, 7 pgs.
PCT Search Report for PCT Application No. PCT/US10/22060, mailed Mar. 8, 2010 (7 pages).
PCT International Search Report and the Written Opinion for Application No. PCT/US2006/001752, mailed on Jul. 27, 2006, 8 pgs.
"Say NO to Third Voice," Worldzone.net, 1999-2004, <http://worldzone.netiinternetipixelsnttv/index.html> [retrieved Jan. 30, 2004], 5 pages.
"Shape Memory Polymer", retrieved on May 7, 2009 at <<http://en.wikipedia.org/wiki/Shape_Memory_Polymer>>, Wikipedia, 8 pgs.
Sohn et al. "Development of a Standard Format for eBooks", SAC2002, Madrid, Spain, 2002 ACM 1-58113-445-2/02/0.
"The Berkman Center for Internet & Society at Harvard Law School: Annotation Engine," Harvard.Edu, 1999-2004, <http://cyber.iaw.harvard.eduJprojects/annotate.html> [Retrieved Jan. 30, 2004], 3 pages.
Marshall, C.C., "The Future of Annotation in a Digital (Paper) World," Proceedings o/the 35th Annual GSLIS Clinic, University of Illinois at UrbanaChampaign, Urbana, 11, Mar. 22-24, 1998, pp. 1-19.
Kumar, A., "Third Voice Trails off . . . ," Wired News, 2004, <http://www.wired.comlnews/printIO. 1294,42803 ,00.html> [retrieved Jan. 30, 2004], 3 pages.
"Universal Unique Identifier", dated Dec. 16, 2002. The Open Group, all pages. Retrieved on Apr. 21, 2010 via Wayback Machine at http://web.archive.org/web/20021216070918/http://www.opengroup.org/onlinepubs/9629399/apdxa.htm.
"Web Services Architecture: W3C Working Group Note Feb. 11, 2004", Feb. 11, 2004, W3C, all pages. Retrieved on Apr. 21, 2010 via Wayback Machine at http://web.archive.org/web/2004040205185/http://www.w3.org/TR/ws-arch/.
Wellman, et al., "Mechanical Design and Control of a High-Bandwidth Shape Memory Alloy Tactile Display", Springer-Verlag, In the Proceedings of the International Symposium on Experimental Robotics, Barcelona, Spain, Jun. 1997, pp. 56-66, 12 pgs.

Yoshikawa, et al., "Vertical Drive Micro Actuator for Haptic Display Using Shape Memory Alloy Thin Film", IEE Japan, Papers of Technical Meeting on Micromachine and Sensor System, Journal Code L2898B, vol. MSS-05, No. 21-44, 2005, pp. 103-108.
Ziviani, N Ed, Baeza-Yates R. et at: "Modern Information Retrieval, Text Operations", Jan. 1, 1999, Modern Information Retrieval, ACM Press, NY, pp. 163-190.
Zobel, J. et al., "Inverted Files for Text Search Engines" ACM Computing Surveys, vol. 38, No. 2, Jul. 1, 2006, pp. 1-56, NY, NY.
Final; Office Action for U.S. Appl. No. 12/360,089, mailed on Mar. 28, 2012, Tom Killalea et al., "Aggregation of Highlights", 17 pages.
Non-Final Office Action for U.S. Appl. No. 12/366,941, mailed on Mar. 30, 2012, Scott Dixon et al., "Bundled Digital Content", 12 pages.
Office action for U.S. Appl. No. 11/693,682, mailed on Apr. 23, 2012, Siegel et al., "Providing Annotations of a Digital Work", 12 pages.
Final Office Action for U.S. Appl. No. 11/763,386, mailed on Apr. 26, 2012, Thomas Ryan et al., "Handling of Subscription-Related Issues in a Media Consumption System", 14 pages.
The Canadian Office Action mailed May 29, 2014 for Canadian patent application No. 2684580, a counterpart foreign application of U.S. Appl. No. 11/763,374, 3 pages.
The Canadian Office Action mailed Aug. 14, 2014 for Canadian patent application No. 2684955, a counterpart foreign application of U.S. Appl. No. 11/693,682, 3 pages.
The Chinese Office Action mailed Jun. 16, 2014 for Chinese patent application No. 200880025056.5, a counterpart foreign application of U.S. Appl. No. 11/763,374, 18 pages.
The Chinese Office Action mailed Jun. 5, 2014 for Chinese patent application No. 201080006308.7, a counterpart foreign application of US patent No. 8,378,979, 9 pages.
The European Office Action mailed Apr. 7, 2014 for European patent application No. 06718773.2, a counterpart foreign application of US patent No. 8,131,647, 7 pages.
The Japanese Office Action mailed Aug. 5, 2014 for Japanese patent application No. 2010-501125, a counterpart foreign application of U.S. Appl. No. 11/763,369, 7 pages.
Office Action for U.S. Appl. No. 13/722,961, mailed on Apr. 25, 2014, John Lattyak, "Delivery of Items for Consumption by a User Device", 4 pages.
Final Office Action for U.S. Appl. No. 11/763,374, mailed on May 14, 2014, Thomas A. Ryan, "Consumption of Items via a User Device", 21 pages.
Final Office Action for U.S. Appl. No. 12/759,828, mailed on May 2, 2014, James R. Retzlaff II, "Search and Indexing on a User Device", 27 pages.
Office Action for U.S. Appl. No. 13/959,589, mailed on Jun. 2, 2014, Thomas A. Ryan, "Administrative Tasks in a Media Consumption System", 24 pages.
Office Action for U.S. Appl. No. 12/949,115, mailed on Jun. 4, 2014, Thomas A. Ryan, "Invariant Referencing in Digital Works", 11 pages.
Office action for U.S. Appl. No. 12/943,211, mailed on Jul. 2, 2014, Retzlaff, II et al., "Obtaining and Verifying Search Indices", 9 pages.
Office action for U.S. Appl. No. 11/763,314, mailed on Aug. 28, 2014, Griffin et al., "Display Dependent Markup Language", 52 pages.
Office action for U.S. Appl. No. 11/537,518, mailed on Sep. 4, 2014, Lattyak, "Acquisition of an Item Based on a Catalog Presentation of Items", 10 pages.
Barnes & Noble, "Nook User Guide", retrieved from the internet Feb. 5, 2013, 120 pgs.
The Canadian Office Action mailed Dec. 15, 2014 for Canadian patent application No. 2681754, a counterpart foreign application of U.S. Appl. No. 11/763,369, 5 pages.
The Mintues of the Oral Proceedings mailed on Nov. 27, 2014 for European patent application No. 06718773.2, a counterpart foreign application of US paten No. 8,131,647, 13 pages.
The European Office Action mailed Sep. 23, 2014 for European patent application No. 08732668.2, a counterpart foreign application of U.S. Appl. No. 11/763,369, 7 pages.

(56) References Cited

OTHER PUBLICATIONS

The European Office Action mailed Nov. 27, 2014 for European patent application No. 06718773.2, a counterpart foreign application of US patent No. 8,131,647, 31 pages.
Malloy, et al. "Google Search", retrieved on Sep. 17, 2014 at <<http://en.wikipedia.org/w/index.php?title=Google_Search&oldid=118323867>>, Wikipedia, the free encyclopedia, Mar. 27, 2007, 6 pages.
The Japanese Office Action mailed Sep. 2, 2014 for Japanese patent application No. 2011-548210, a counterpart foreign application of U.S. Appl. No. 12/360,744, 4 pages.
The Japanese Office Action mailed Dec. 16, 2014 for Japanese patent application No. 2009-544304, a counterpart foreign application of U.S. Appl. No. 11/693,677, 2 pages.
Kindle Community, Discussions—Screen Saver, retrieved from the internet on Nov. 6, 2009 at <<http://www.amazon.com/tag/kindle/forum?cdForum=Fx1D7SY3BVSESG&cdThread=Tx28QGUBE29L22J>>, 4 pages.
"Kobo Wireless eReader & Desktop Application User Guide", Feb. 2011, 170 pgs.
The Korean Office Action mailed Dec. 19, 2014 for Korean patent application No. 10-2009-7024280, a counterpart foreign application of U.S. Appl. No. 11/763,374, 10 pages.
Office Action for U.S. Appl. No. 12/366,941, mailed on Jan. 6, 2015, Scott Dixon, "Bundled Digital Content", 15 pages.
Final Office Action for U.S. Appl. No. 11/537,518, mailed on Jan. 9, 2015, John Lattyak, "Acquisition of an Item Based on a Catalog Presentation of Items", 13 pages.
Office Action for U.S. Appl. No. 12/886,877, mailed on Jan. 15, 2015, Gilles Jean Roger Belin, "Cover Display", 45 pages.
Office Action for U.S. Appl. No. 13/722,961, mailed on Oct. 10, 2014, John Lattyak, "Delivery of Items for Consumption by a User Device", 8 pages.
Office Action from the U.S. Patent and Trademark Office for Application U.S. Appl. No. 11/763,378, mailed on Oct. 6, 2014, Lattyak et al., "Transfer of Instructions to a User Device", 16 pgs.
Office Action for U.S. Appl. No. 11/693,682, mailed on Oct. 7, 2014, Siegel et al., "Providing Annotations of a Digital Work", 12 pages.
Final Office Action for U.S. Appl. No. 13/959,589, mailed on Nov. 6, 2014, Thomas A. Ryan, "Administrative Tasks in a Media Consumption System", 29 pages.
Office Action for U.S. Appl. No. 12/886,877, mailed on Feb. 21, 2014, Gilles Jean Roger Belin, "Cover Display", 36 pages.
Office Action for U.S. Appl. No. 13/070,328, mailed on Feb. 25, 2014, Sailesh Rachabathuni, "Last Screen Rendering for Electronic Book Readers", 11 pages.
Office action for U.S. Appl. No. 12/567,984, mailed on Mar. 15, 2013, Kim, "Last Screen Rendering for Electronic Book Readern", 10 pages.
Office action for U.S. Appl. No. 13/070,328, mailed on Jul. 25, 2013, Rachabathuni, "Last Screen Rendering for Electronic Book Readers", 11 pages.
Office action for U.S. Appl. No. 13/070,328, mailed on Aug. 12, 2014, Rachabathuni, "Last Screen Rendering for Electronic Book Readers", 6 pages.
Office action for U.S. Appl. No. 12/886,877, mailed on Aug. 13, 2014, Belin et al., "Cover Display", 40 pages.
Office action for U.S. Appl. No. 12/886,877, mailed on Sep. 11, 2013, Belin et al., "Cover Display", 31 pages.
Office action for U.S. Appl. No. 13/083,445, mailed on Sep. 24, 2014, Siegel et al., "Method and System for Providing Annotations of a Digital Work", 31 pages.
Non-Final Office Action for U.S. Appl. No. 12/567,984, mailed on Sep. 27, 2012, John T. Kim, "Last Screen Rendering for Electronic Book Reader", 9 pages.
Canadian Office Action mailed Feb. 11, 2015 for Canadian patent application No. 2681755, a counterpart foreign application of U.S. Appl. No. 11/763,349, 4 pages.
Canadian Office Action mailed Mar. 30, 2015 for Canadian patent application No. 2688002, a counterpart foreign application of U.S. Appl. No. 11/763,358, 5 pages.
Japanese Office Action mailed Mar. 10, 2015 for Japanese patent application No. 2010-501125, a counterpart foreign application of U.S. Appl. No. 11/763,369, 19 pages.
Translated Korean Office Action mailed Dec. 19, 2014 for Korean patent application No. 10-2009-7024279, a counterpart foreign application of U.S. Appl. No. 11/763,358, 6 pages.
Final Office Action for U.S. Appl. No. 11/763,378, mailed on Feb. 5, 2015, John Lattyak, "Transfer of Instructions to a User Device", 21 pages.
Office Action for U.S. Appl. No. 13/959,589, mailed Feb. 26, 2015, Thomas A. Ryan, "Administrative Tasks in a Media Consumption System", 45 pages.
Final Office Action for U.S. Appl. No. 12/943,211, mailed on Apr. 24, 2015, James R. Retzlaff II, "Obtaining and Verifying Search Indices", 10 pages.
Chinese Office Action mailed Mar. 30, 2015 for Chinese patent application No. 200880017589.9, a counterpart foreign application of U.S. Appl. No. 11/763,369, 10 pages.
Office Action for U.S. Appl. No. 14/179,380, mailed on Dec. 19, 2014, Girish Bansilal Bajaj, "Providing User Supplied Items to a User Device", 11 pages.
Office action for U.S. Appl. No. 13/083,445, mailed on May 27, 2015, Siegel et al., "Method and System for Providing Annotations of a Digital Work", 27 pages.

\* cited by examiner

INDICATORS FOR NAVIGATING DIGITAL WORKS

BACKGROUND

The continued proliferation of digital works has led to an increase in the availability of such digital works, as well as an increase in the availability of electronic devices used for consuming these items. For instance, users now consume electronic books, videos, songs, and the like on an assortment of stationary and/or portable electronic devices.

Typically, digital works are structured as virtual frames presented on a computing device, and a user may turn or change from one virtual frame or "page" of electronic content to another. The term "page" as used herein refers to a collection of content presented at one time on a display. Thus, "pages" as described herein are not fixed permanently, and may be redefined or repaginated based on variances in display conditions, such as screen size, font type or size, margins, line spacing, resolution, or the like. Due in part to the variable nature of such "pages," users may find it difficult to gauge their progress through the digital work and recall a location in the digital work at which they read a particular passage. This problem is compounded by the fact that digital works may be displayed and read on a variety of different computing devices (e.g., eBook reader devices, mobile telephones, portable digital assistants (PDAs), etc.), under a variety of different display conditions (e.g., screen size and resolution, font type and size, margins, line spacing, etc.).

Accordingly, there remains a need to improve a reader's ability to navigate within a digital work and to better identify his or her location within the content of the digital work, such that the user is able to navigate back to this location at a later time.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 2A illustrates an example where each section of a digital work is associated with a unique visual indicator, and corresponding segments of the progress bar are also associated with the respective unique visual indicators. Here, the visual indicators comprise colors, patterns, and/or the like.

DETAILED DESCRIPTION

Overview

Figure 1:
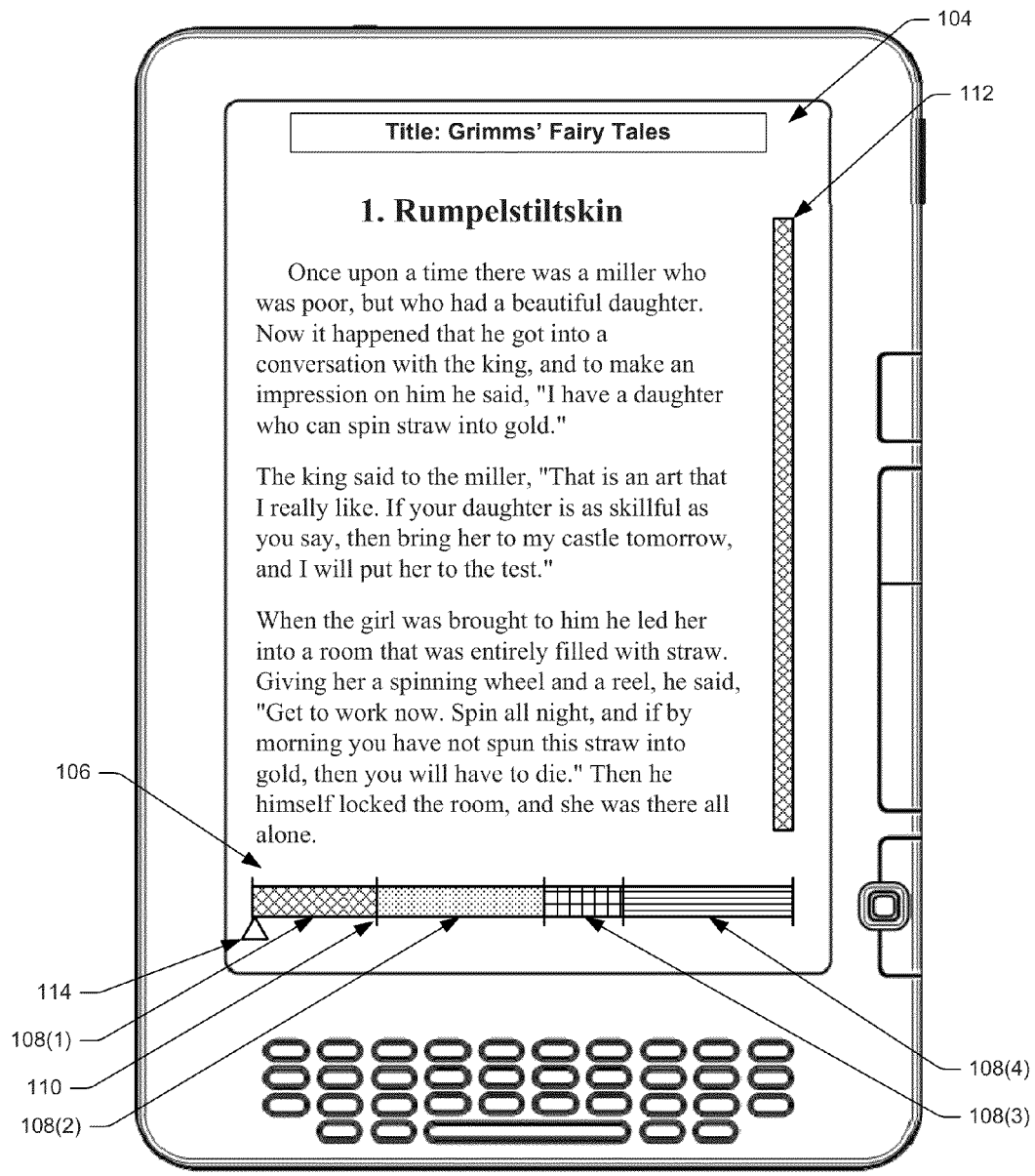
FIG. 1 illustrates an example electronic device displaying a digital work along with a progress gauge, here in the form of a progress bar, which includes discrete segments associated with corresponding sections in the digital work. As illustrated, each segment is color-coded or pattern-coded to correspond to a color or pattern on content within the corresponding section. In this example, the currently rendered content of the digital work includes a color or pattern stripe on the side, with corresponds to the color or pattern on first segment of the progress bar. In some instances, the progress bar allows a user to navigate to different locations within the digital work and also illustrates the user's progress through the digital work.

This disclosure describes, in part, a progress gauge used to indicate a user's location in a digital work and to associate locations within the digital work with corresponding locations on the progress gauge. A progress gauge as described herein may take the form of any visual or audible gauge configured to apprise a user of their current location within a digital work. For instance, the progress gauge may comprise a progress bar having numerous segments corresponding to different sections (e.g., chapters, acts, scenes, etc.) within a digital work. Each segment of the progress bar may include a unique visual indicator, while each page within the corresponding section of the digital work may also include the unique visual indicator or another type of indicator that maps to the visual indicator on the progress bar.

For instance, each page within a first chapter of a particular digital work may have a blue stripe on the side of the page, while each page in the second chapter may include a green stripe, each page in the third chapter a red stripe, and so forth. Additionally, when an electronic device renders the digital work, the electronic device may also render a progress bar corresponding to the digital work. The progress bar may include a first, blue segment corresponding to the first chapter, a second, green segment corresponding to the second chapter, a third, red segment corresponding to the third chapter, and so forth. By visually mapping content within a logical section to corresponding locations on the progress bar, a user is more likely to be able to later navigate back to that page if the user desires.

For instance, envision that while the user is in the seventh chapter of a book, the user wishes to navigate back to a page of content found in a previous chapter. The user may not recall exactly where the page was located, but may recall that the desired page included a green stripe on the side. The user may then visually identify the green segment of the progress bar, indicating that the page can be found in the second chapter. The user may thereafter navigate to the second chapter to locate the desired page.

In addition to including visual indicators for navigating a digital work, the progress bar may represent a user's progress through a digital work. The progress gauge may be divided into the segments using one or more content dividers. Each segment of the progress gauge corresponding to a section of the digital work may visually represent an amount of content in the corresponding section of the digital work, relative to other sections of the digital work. For instance, a first segment corresponding to a chapter that is fifty pages may be twice as large as a second segment corresponding to a chapter that is twenty-five pages. Accordingly, a user may, at a glance, assess his or her progress through the digital work. Example progress gauges and progress bars may be found in U.S. application Ser. No. 11/693,685, filed Mar. 29, 2007, and entitled "Relative Progress and Event Indicators", which is incorporated herein by reference.

In some instances, the progress bar itself may be navigable. For instance, in the example above, the user may be able to select the second segment of the progress bar either to navigate to the second chapter of the digital work and/or to zoom in on the second segment of the progress bar as described in detail below. In either instance, the navigable progress bar allows the user to easily navigate back to a desired location within the digital work, in addition to aiding the user in remembering the location of the desired location.

In still other instances, content of a digital work may be associated with multiple different unique indicators, such as a top-level indicator, a second-level indicator, and so forth. For instance, in the example above, each page of the first chapter of the digital work may include a blue stripe on the side. Additionally, each page (or each set of multiple pages) may be associated with another indicator, such as an image of a unique object.

To illustrate, a first page in the first chapter may include the blue stripe associated with the first chapter, as well as an image of a dog. The second page, meanwhile, may include the blue stripe along with an image of a cat. As such, when the user later wishes to navigate back to a page, the user may recall that the desired page not only had a blue stripe on it, but also a picture of a cat. The user may then map the blue stripe to the blue segment of the progress bar, and from there may locate the page within the first chapter having the image of the cat.

In instances where the progress bar is navigable, for instance, the user may request to zoom in on the first (i.e., blue) segment of the progress bar. In response, the electronic device may enlarge the first segment and may also surface images that are associated with pages of the content within the first chapter of the digital work. In another example, the device may surface thumbnail views of the pages, which may include these images. In either instance, the user may navigate the images or thumbnails on the progress bar to identify and select the desired image or thumbnail. In response, the device may render the corresponding page of content.

In some instances, the indicators associated with different sections of a digital work are associated with a digital work by an entity other than the user, such as by a distributor of the digital work, a rights holder in the digital work, or the like. In other instances, meanwhile, the indicators may be specified by and custom to a user. For instance, the user may select to color code chapters in a particular manner, may select the images to associate with pages or chapters, and the like. The indicators may be visual and/or audible in some instances. For instance, each page in a particular chapter may be associated with a particular sound (e.g., a train whistle) and the corresponding indicator in the progress bar may comprise an image corresponding to the sound (e.g., a train). As such, a user may recall that she heard a train whistle near the page she is looking for, and may navigate to the appropriate chapter after locating the train on the progress bar.

Furthermore, the indicators may or may not be associated with underlying content of the digital work. For instance, the indicators may comprise colors, patters, images, or sounds that are unique relative to one another but that do not otherwise correlate to the digital work. In other instances, meanwhile, the indicators may relate to the content (e.g., plot, theme, etc.) of the digital work.

In some instances, the progress gauges described herein may show a user's progress through a digital work with reference to the entire length of the digital work. In addition, these progress gauges may include additional information about the structure, content, and/or layout of the digital work. In one example, content dividers are used to divide the progress gauge into segments corresponding to sections of the digital work. Each segment of the progress gauge is sized to visually represent an amount of content in the corresponding section of the digital work, relative to other sections of the digital work.

In addition to the techniques for providing unique indicators to aid in a user's navigation of a digital work, the disclosure describes techniques for logging indications of where, geographically, users read particular sections of a digital work. For instance, the techniques may log these geographical locations in association with the consumed portions of the digital work so that the user may later navigate back to a desired portion by specifying a geographical location at which she remembers reading the desired portion.

The techniques may further log additional information associated with these reading events, such as a device on which the user read the different portions of the digital work, a time at day and/or date on which the user read these portions, and the like. By maintaining this information, the user is able to more easily locate content that she previously read. For instance, a user may request that her device render a page that she read two days ago on her phone while she was at home. In response, the device may render the requested page and/or one or more candidate pages that most closely match the specified criteria.

In the some of the implementations below, the techniques are described in the context of displaying electronic books ("eBook") or digital works. The terms "eBook" and "digital work" are used synonymously and, as used herein, may include any type of content which can be stored and distributed in digital form. By way of illustration, without limitation, digital works and eBooks can include all forms of textual information such as books, magazines, newspapers, newsletters, periodicals, journals, reference materials, telephone books, textbooks, anthologies, proceedings of meetings, forms, directories, maps, manuals, guides, references, photographs, articles, reports, documents, etc., and all forms of audio and audiovisual works such as music, multimedia presentations, audio books, movies, etc.

Also, while the techniques are illustrated in various implementations as being implemented on an eBook reader device, the concepts may be implemented in other electronic devices besides eBook reader devices including, for example, personal computers, mobile telephones, portable computers (e.g., laptops or pocket PCs), personal digital assistants (PDAs), portable gaming devices, wireless phones, and the like. Similarly, while certain implementations are described in the context of presentation of textual media, the techniques are also applicable to consumption of other types of digital works, such as audio, video, multimedia, or other types of content. In addition, while progress gauges are described as visually representing a user's progress through a digital work, in some instances progress gauges may additionally or alternatively represent a user's progress through a digital work audibly or in a tactile manner.

Example Indicators for Navigating Digital Works

FIG. 1 illustrates an example electronic device 102 displaying a digital work 104 along with a progress gauge, here in the form of a progress bar 106. As illustrated, the progress bar 106 includes discrete segments 108(1), 108(2), 108(3), and 108(4) associated with corresponding sections in the digital work. One or more content dividers 110 may define these sections, which may comprise chapters, stories, acts, scenes, equally sized portions of content of the digital work 104 or any other logically defined section. In this example, the digital work 104 comprises a collection of four stories and each section corresponds to one of the stories. As used herein, the phrase "discrete" means separate in some manner. For instance, chapters in a book may comprise discrete segments since the content therein is separated by this chapter segmentation.

In FIG. 1, each segment 108(1)-(4) is shown to have a hatching that is unique relative to each other hatching. This hatching may indicate that each segment is color-coded or pattern-coded to correspond to a color or pattern on content within the corresponding section. For instance, FIG. 1 shows that the first segment 108(1) of the progress bar includes a hatching that either represents a unique color or a unique pattern. Each page within the first section of the digital work 104 may correspondingly include the unique color or the unique pattern. In one example, for instance, the first segment 108(1) may be blue, the second segment 108(2) green, the third segment 108(3) red, and the fourth segment 108(4) yellow. As such, pages within the first, second, third, and fourth sections may include blue, green, red, and yellow, respectively. These pages may include these colors via a stripe on an edge of each respective page, based on the text being rendered in the respective color, or in any other way. It is to be appreciated that, as used herein, unique visual indicators may be unique within a digital work, and yet reused in multiple different digital works. For instance, each of multiple different digital works may have a blue stripe in each page in a first chapter of the work, a green stripe in each page of a second chapter, and so forth.

Returning to the example of FIG. 1, the illustrated page of "Rumpelstiltskin" includes a visual indicator 112 that corresponds to the first segment 108(1) of the progress bar 106. For instance, the visual indicator 112 may comprise a blue stripe corresponding to the blue portion (segment 108(1)) of the progress bar 106. FIG. 1 further illustrates that the progress bar 106 may include a location indicator 114 indicating the location within the digital work 104 currently being rendered. In this example, by rendering the blue stripe along the edge of the page along with the correspondingly color-coded progress bar 106, the user may be able to return to this page based on the user's memory that the page included the blue stripe.

Figure 2A:
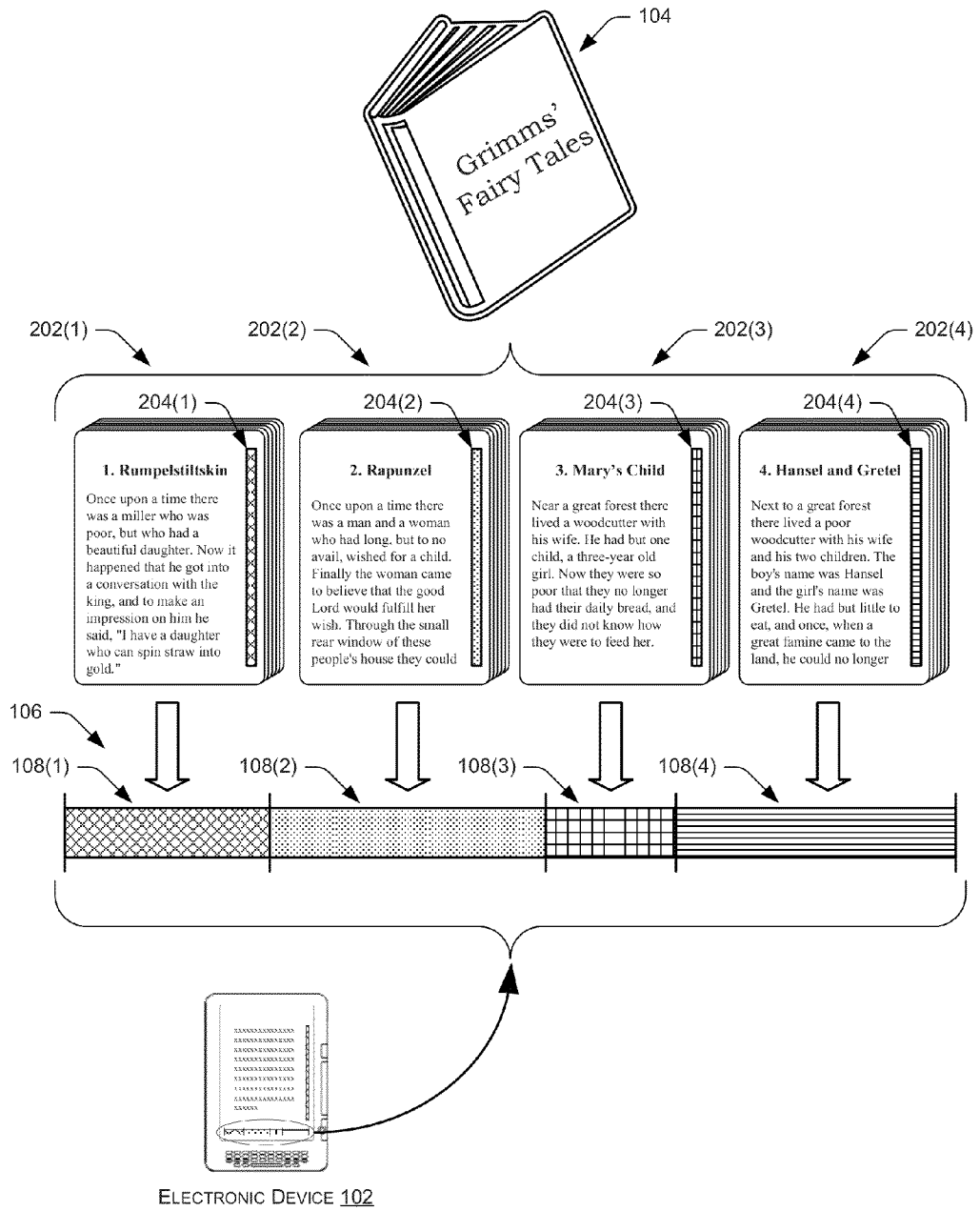

FIG. 2A further illustrates that each section 202(1), 202(2), 202(3), and 202(4) of the digital work 104 from FIG. 1 may be associated with a unique visual indicator, as may be corresponding segments of the progress bar 106. For instance, FIG. 2A illustrates that the section 202(1) of the digital work 104 may be associated with a unique indicator 204(1), which may comprise the color blue in this example. Similarly, the segment 108(1) corresponding to the first section 202(1) may also be associated with the color blue. As such, when a user of the electronic device 102 navigates to a page of content within the first section 202(1), the device 102 may render the blue stripe adjacent to the text of the digital work 104.

In addition, FIG. 2A illustrates that the second section 202(2) is associated with a unique indicator 204(2), as is the second segment 108(2) of the progress bar 106. In addition, FIG. 2A illustrates that the third section 202(3) of the digital work 104 is associated with a unique indicator 204(3), as is the third segment 108(3) of the progress bar. Finally, FIG. 2A illustrates that the fourth section 202(4) of the digital work 104 is associated with a unique indicator 204(4), as is the corresponding fourth segment 108(4) of the progress bar.

In the example of FIG. 2A, the unique indicators 204(1)-(4) comprise colors or patterns. As such, each page of the digital work may include a stripe along an edge of the text of the page, with the stripe corresponding to the unique color or pattern associated with that page's section.

Figure 2B:
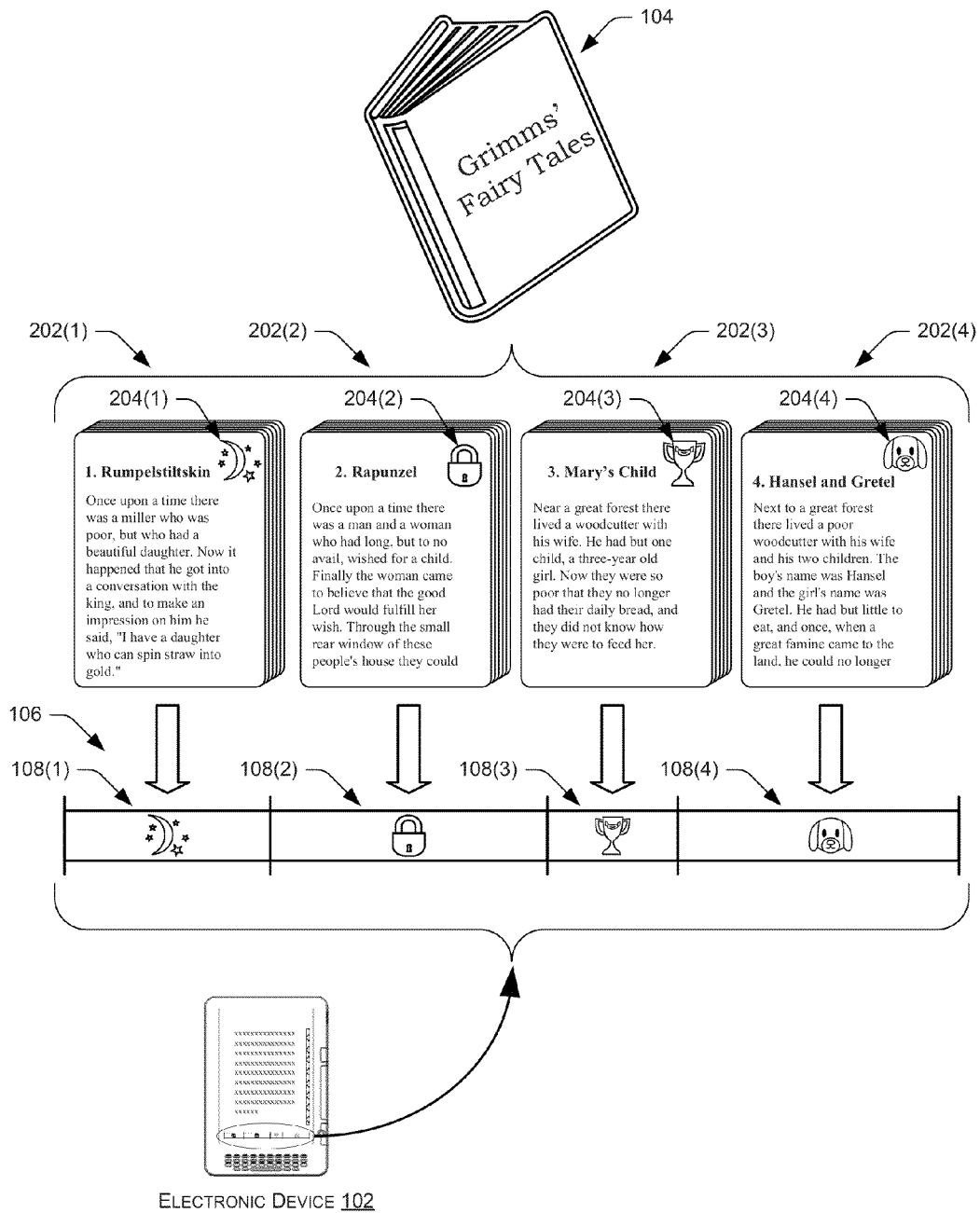
FIG. 2B illustrates another example where each section of a digital work is associated with a unique visual indicator, and corresponding segments of the progress bar are also associated with the respective unique visual indicators. Here, the visual indicators comprise images of different objects.

FIG. 2B illustrates another example where each of the sections 202(1)-(4) of the digital work 104 is associated with the unique visual indicators 204(1)-(4), as are the corresponding segments 108(1)-(4) of the progress bar 106. In this instance, however, the unique indicators 204(1)-(4) comprise images of different objects. For instance, FIG. 2B illustrates that the indicator 204(1) comprises an image of the moon and stars, the indicator 204(2) comprises an image of a padlock, the indicator 204(3) comprises an image of a trophy, and the indicator 204(4) comprises an image of a dog. In addition, the first segment 108(1) of the progress bar 106 is shown to include the image of the moon, the second segment 108(2) the image of the padlock, the third segment 108(3) the image of the trophy, and the fourth segment 108(4) the image of the dog.

Therefore, whenever a user navigates to a page within the first section 202(1) within the first section, the page will include the image of the moon and stars. Conversely, when the user navigates to any page within the second section 202(2), the page will include the image of the padlock, and so forth. Thereafter, if a user wishes to navigate back to a particular page that the user has previously read, the user may use the image of the object that she remembers seeing on the page to aid her navigation. For instance, if the user recalls that the desired page included an image of a padlock on it, the user may reference to the progress bar 106 and identify that the page likely resides in the second section 202(2) of the digital work 104 corresponding to the second segment 108(2) of the progress bar. The user may then navigate to the second section 202(2) of the digital work to locate the exact page.

Figure 2C:
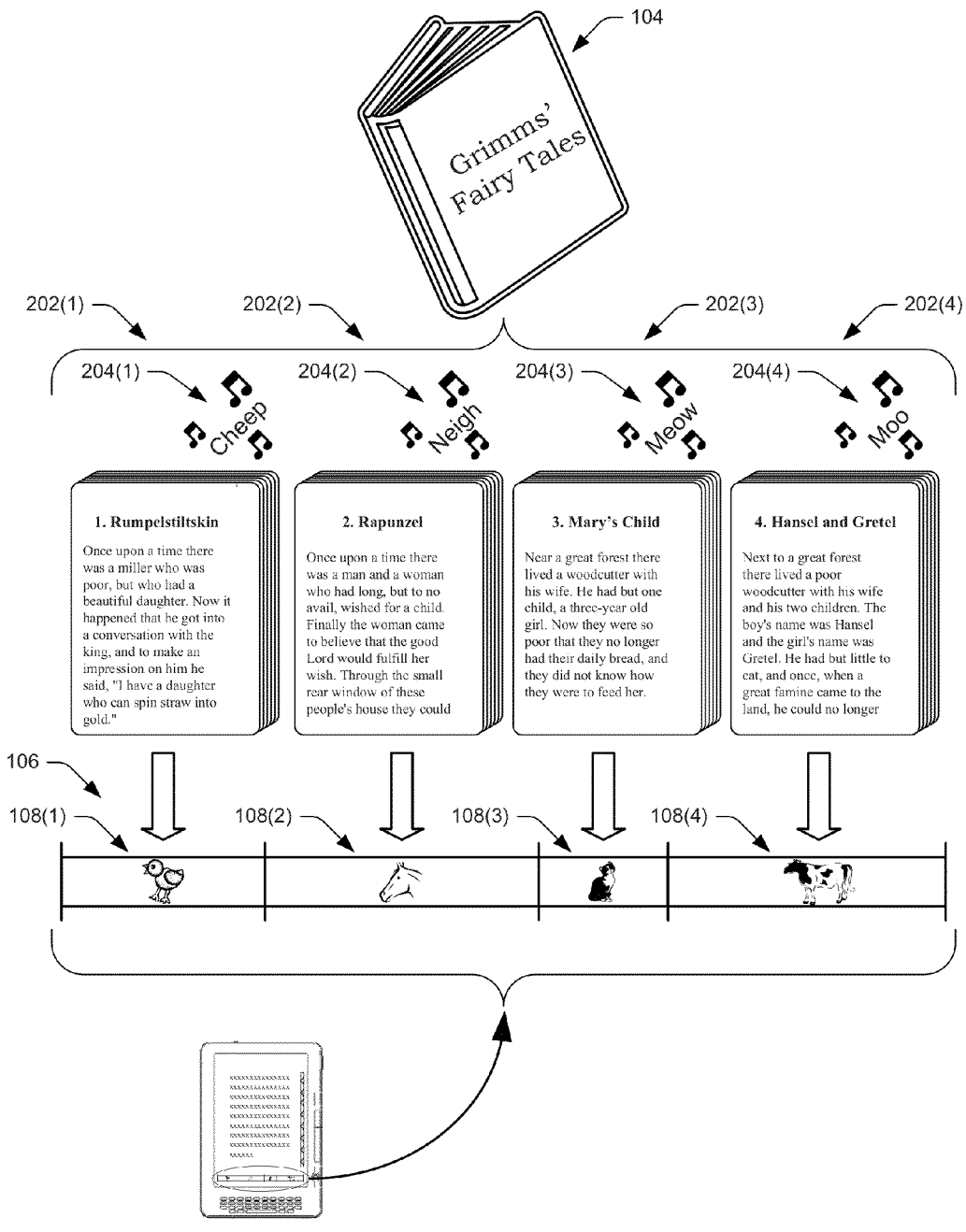
FIG. 2C illustrates an example where each section of a digital work is associated with a unique audible indicator, and corresponding segments of the progress bar are also associated with and include visual representations of the respective unique audible indicators. For instance, when a user turns pages within the first section of the digital work, the illustrated client device may output the sound of a chick ("cheep") on speakers of the device. In addition, the first segment of the progress gauge illustrates a chick, thus linking the audible indicator associated with the first section of the digital work with the first segment of the progress bar.

FIG. 2C illustrates yet another example where each of the sections 202(1)-(4) of the digital work 104 is associated with the unique indicators 204(1)-(4), as are the corresponding segments 108(1)-(4) of the progress bar 106. In this example, however, FIG. 2C illustrates that the unique indicators 204(1)-(4) comprise unique audible indicators. For instance, the first section 202(1) of the digital work 104 has been associated with the "cheeping" sound of a chick, the second section 202(2) with the "neighing" sound of a horse, the third section 202(3) with the "meowing" sound of a cat, and the fourth section 202(4) with the "mooing" sound of a cow. In addition, the corresponding segments 108(1)-(4) illustrate images of the respective animals associated with these sounds. For instance, the first segment 108(1) includes an illustration of a chick, the second segment 108(2) an illustration of a horse, and so forth.

By associating the sections 202(1)-(4) with the corresponding sounds, the electronic device may audibly output these sounds when rendering pages within the digital work 104. For instance, when a user turns to a page within the first section 202(1), the device 102 may audible output (on speakers of the device) a "cheep" sound. Conversely, when the user turns to a page within the third section 202(3), the device may audible output a "meow" sound. As such, when user later wishes to navigate back to a particular page, she may recall the sound played back by the device 102 when she turned to the page, and may map this recollection to the illustrations of the progress bar 106 for navigation to the appropriate section.

Figure 3:
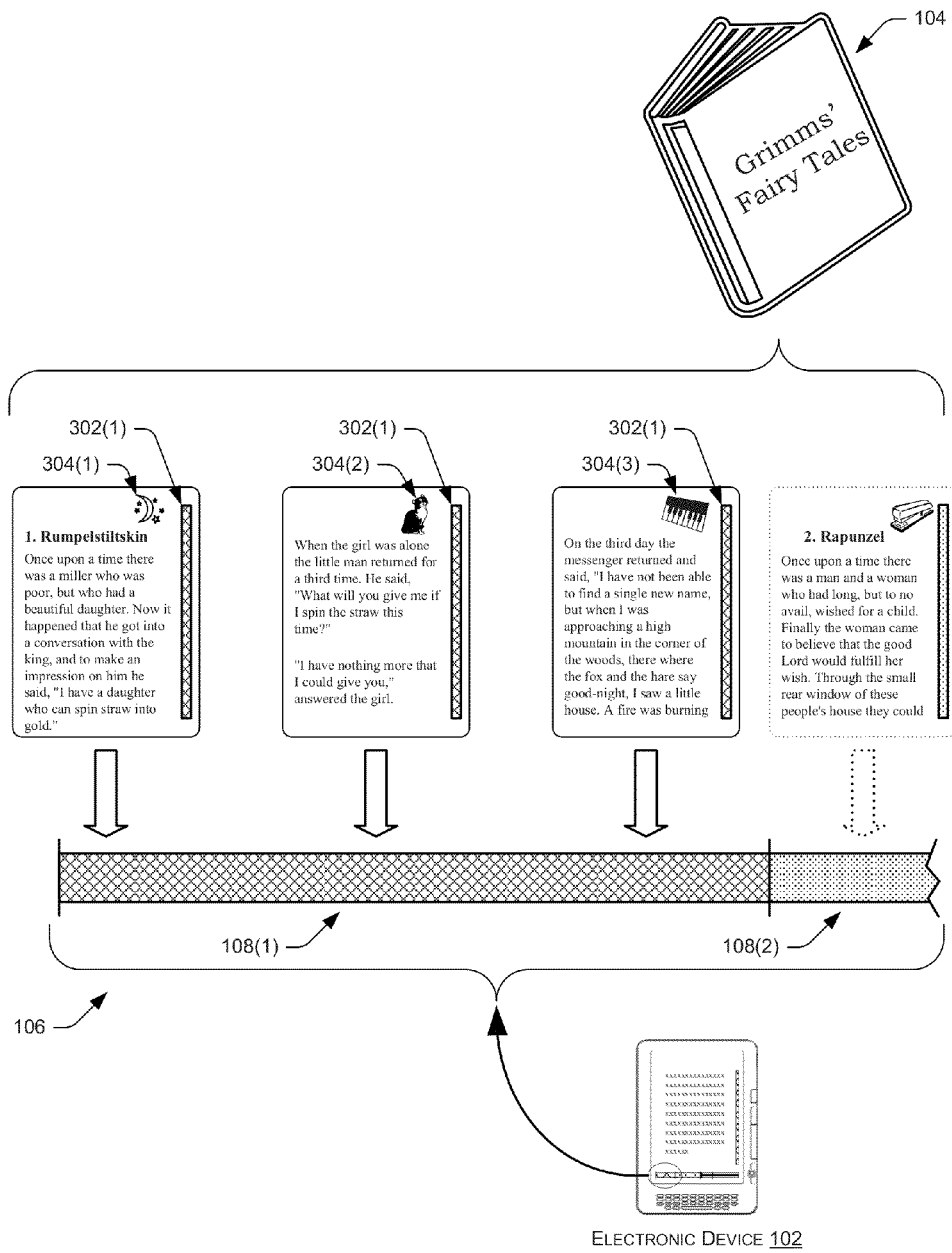
FIG. 3 illustrates an example where each piece of content within a section of the digital work is associated with a same top-level indicator as well as a second-level indicator that is unique relative to other pieces of content within the same section. For instance, in this example, each page of content is associated with, and hence, is rendered along with, a particular color or pattern, while also being rendered along with an image of a unique object (e.g., the moon, a cat, a piano, etc.).

FIG. 3 illustrates an example where each page within a section of the digital work is associated with a same top-level indicator 302(1), as well as with a second-level indicator 304(1), 304(2), and 304(3) that is unique relative to second-level indicators associated with other pieces of content within the same section. For instance, in this example, each page of content within the first section 202(1) of content is associated with, and hence, is rendered along with, a particular color or pattern, such as the example blue stripe. In addition, each page is rendered with an image of a unique object. Here, a first page is rendered with a moon, a second page with a cat, and a third age with a piano.

In this context, an image may be assigned to a "page" in a number of ways. For instance, each image may be assigned to predefined range of invariant reference locators of a particular digital work, which are described in detail below. For example, a first image may be assigned to a first amount of text of a certain, a second image may be assigned a second amount of text of the certain size, and so forth. By assigning images to content in this manner, the images will stay associated with the same content regardless of the display conditions (e.g., font, line spacing, etc.) on which the content is rendered.

Rendering multiple different levels of indicators may further aid a user in locating a desired page. For instance, envision that a user recalls that a page she is looking for includes both a blue stripe on the side as well as an image of a cat. The user may first map the blue stripe to the first segment 108(1) of the progress bar 106, and may thereafter navigate within the progress bar 106 and/or within the first section 202(1) of the digital work 104 to identify the page having the image of the cat. While FIG. 3 illustrates an example with two different levels of unique indicators, it is to be appreciated that the techniques may apply for any other number of levels.

Figure 4A:
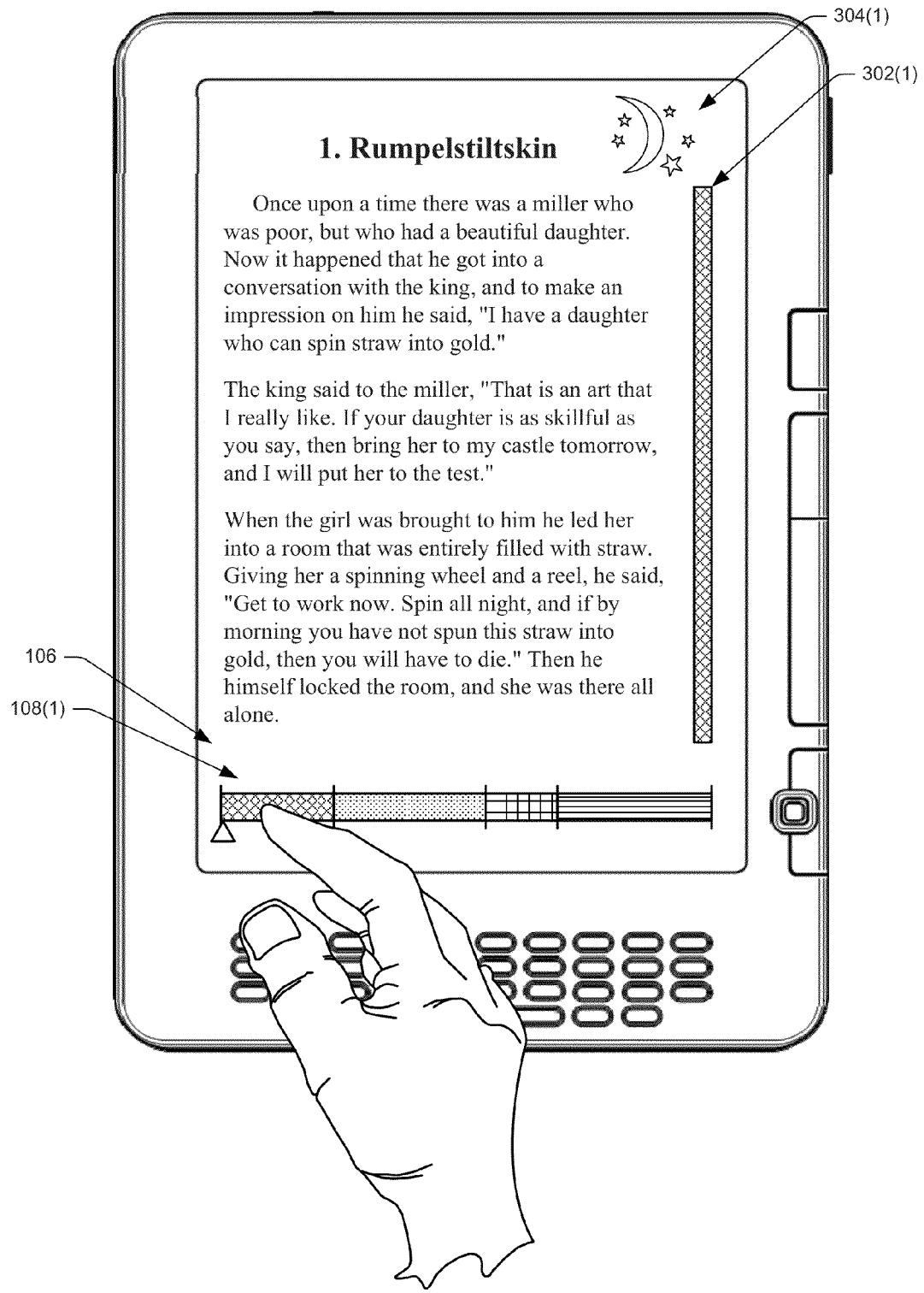
FIG. 4A illustrates an example where a user request to zoom in on a particular segment of the progress bar that is associated with a unique visual indicator.

FIG. 4A illustrates an example where the progress bar 106 is navigable and, hence, may aid a user in locating desired pages within a digital work. In this example, the user requests to zoom in on the first segment 108(1) of the example progress bar 106. For instance, envision that the user is looking for a page of content that she previously read that included a blue stripe on the side. As such, the user may select the blue segment 108(1). The user may select this segment 108(1) in any way depending upon capabilities of the device. For instance, a user may select segments via a touch screen (as illustrated), a keyboard, a five-way controller, or the like.

Figure 4B:
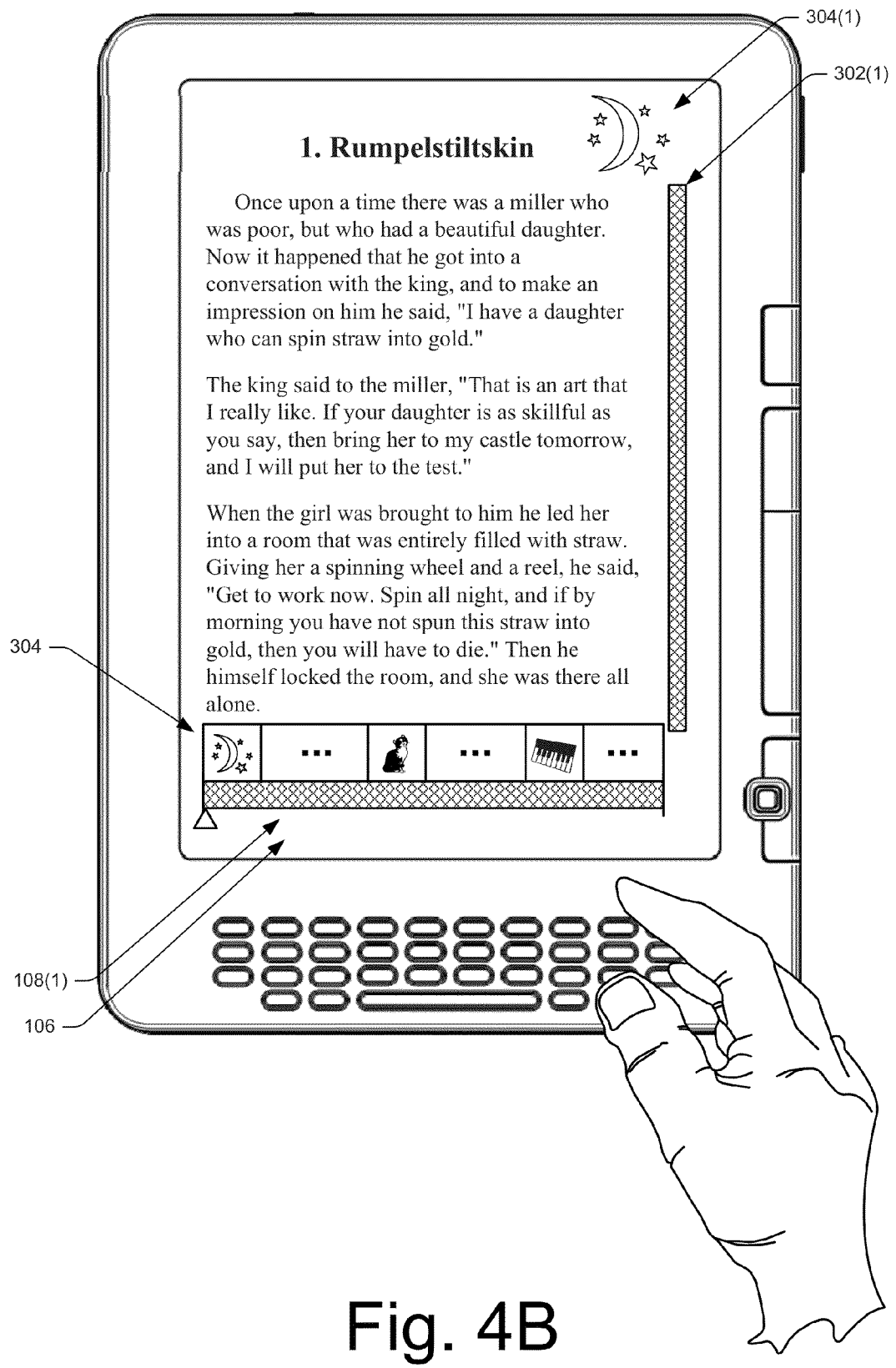
FIG. 4B illustrates one possible user interface (UI) that the electronic device may render in response to receiving the request of FIG. 4A. Here, the device has enlarged the selected segment of the progress bar and has rendered at least some of the second-level visual indicators associated with the respective pieces of content within the section of the digital work corresponding to the selected segment. In some instances, the user may select one of the images to cause the device to render the corresponding piece of content.

FIG. 4B illustrates that the electronic device 102 has enlarged the selected segment 108(1) in response to receiving the request to zoom from the user. In addition to enlarging the segment 108(1), the device 102 may render some or all of the second-level visual indicators associated with the respective pages of content within the first section 202(1) of the digital work 104. While this example illustrates the three objects illustrated in FIG. 3, it is to be appreciated that the progress bar 106 may include more or fewer images in other implementations. Furthermore, in some instances the user may be able to scroll or otherwise manipulate the images to locate the desired image.

In some instances, the user may select one of the images to cause the device to render the corresponding piece of content. For instance, after locating the illustrated cat corresponding to the desired page, the user may select this image (e.g., via a touch screen, a keyboard, etc.). In response, the device 102 may render the corresponding page in lieu of the currently rendered page of content.

Figure 4C:
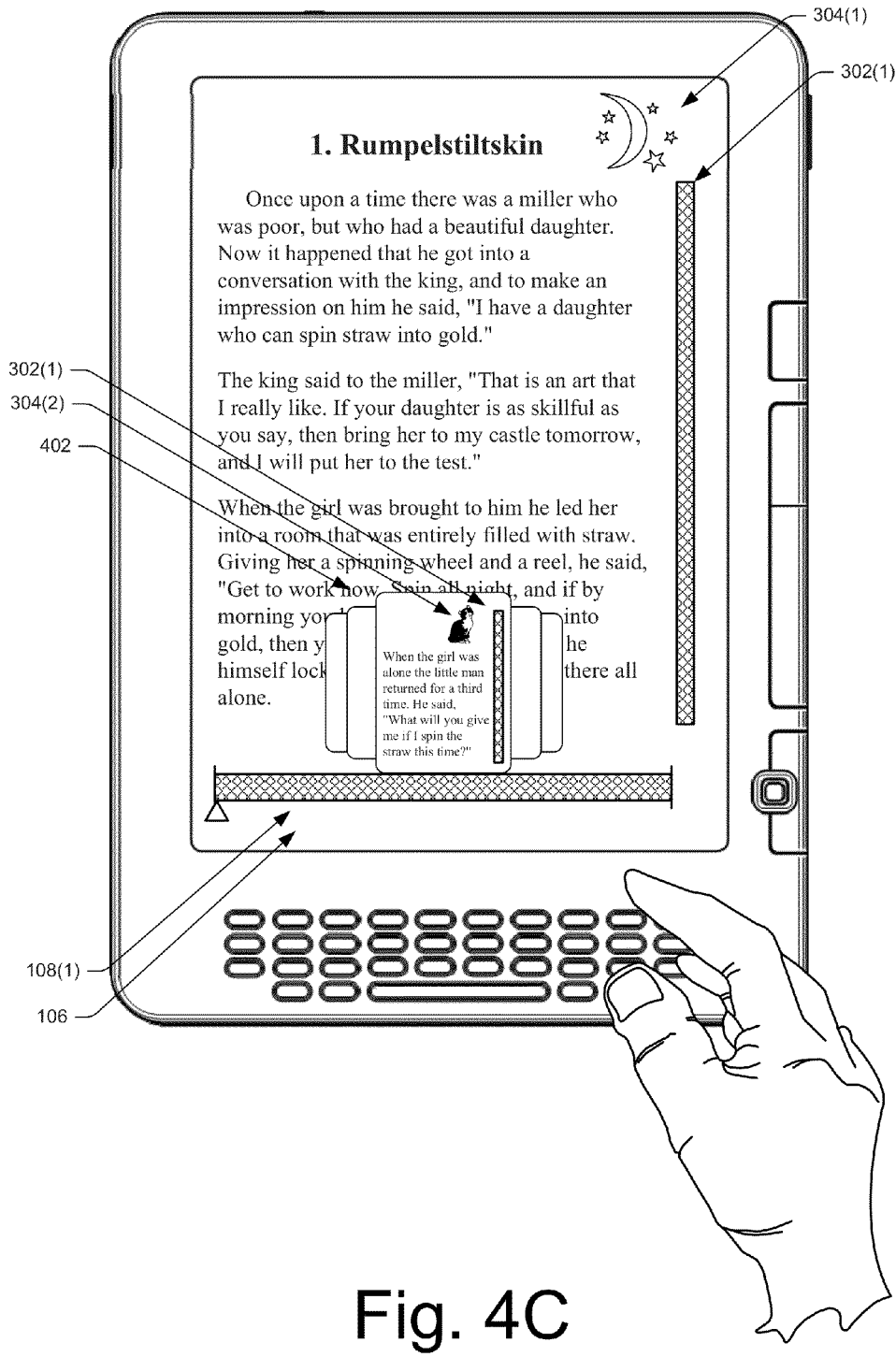
FIG. 4C illustrates an alternative user interface (UI) that the electronic device may render in response to receiving the request of FIG. 4A. Here, the device has enlarged the selected segment of the progress bar and has rendered thumbnail views of one or more pages of content within the section of the digital work corresponding to the selected segment. In this example, the thumbnails include the second-level visual indicators associated with the respective pages of content. A user may also select one of the thumbnails to instruct the device to render a corresponding full view of the selected thumbnail.

FIG. 4C, meanwhile, illustrates an alternative user interface (UI) that the electronic device 102 may render in response to receiving the request of FIG. 4A. Here, the device 102 has enlarged the selected segment 108(1) of the progress bar and has rendered thumbnail views 402 of one or more pages of content within the first section 202(1) of the digital work 104. In this example, the thumbnails include the second-level visual indicators 304 associated with the respective pages of content. In some instances, the user may be able to scroll forwards or backwards through the thumbnails to identify the desired page. The user may then select the desired thumbnail to instruct the device 102 to render a corresponding full view of a selected thumbnail in lieu of the currently rendered page. Furthermore, while FIG. 4C illustrates that the thumbnails may include both the top-level indicator 302(1) and the second-level indicator 304(2), the thumbnails may alternatively or additionally include other information, such as keywords from within the page, images within the page, or the like.

Figure 5:
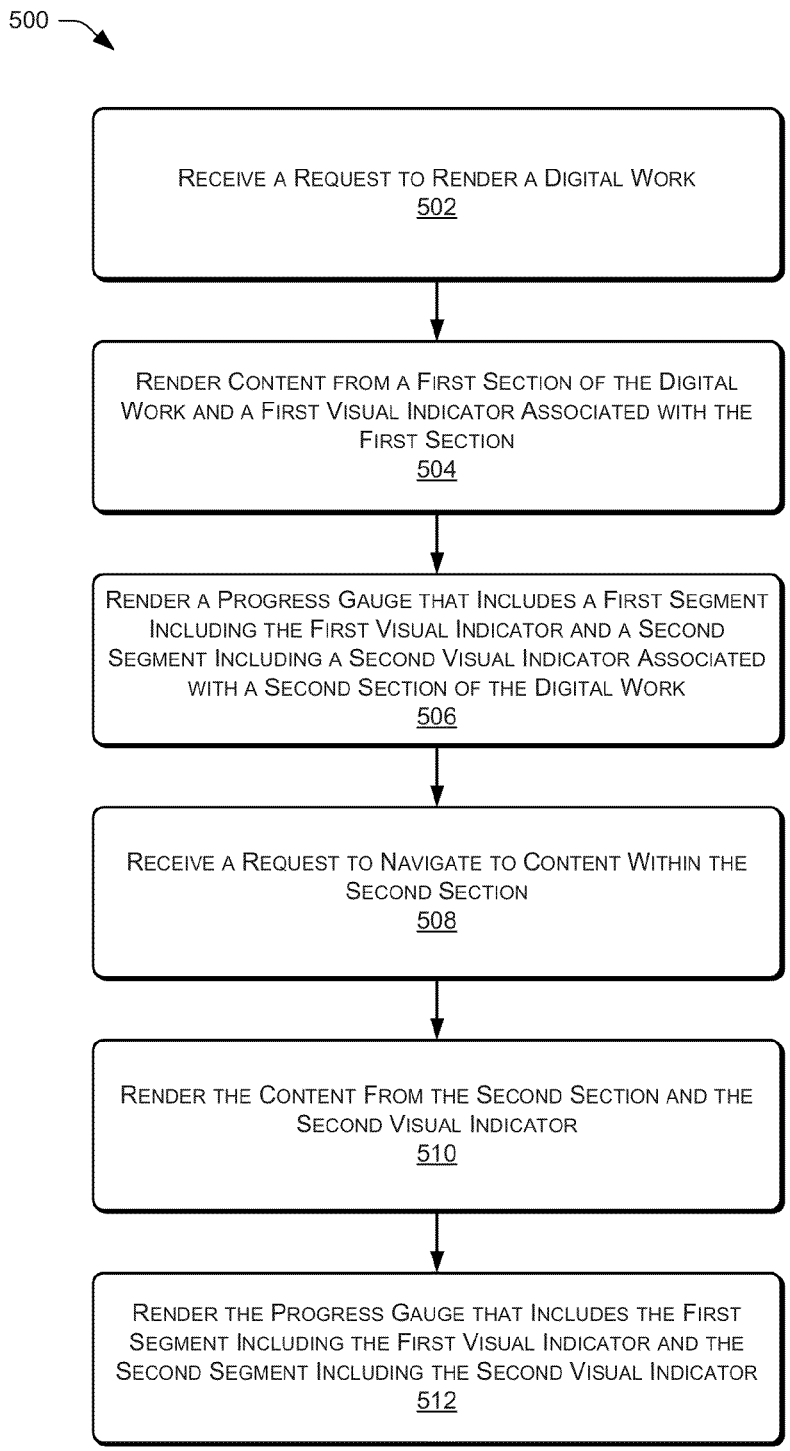
FIG. 5 illustrates an example process for rendering content of a digital work along with a progress gauge for allowing a user to more easily navigate within the digital work.

FIG. 5 illustrates an example process 500 for rendering content of a digital work along with a progress gauge for allowing a user to more easily navigate within the digital work. This process 500, as well as each process described herein, can be implemented in hardware, software, or a combination thereof. In the context of software, the illustrated operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

At 502, the process 500 receives a request to render a digital work, with the digital work including at least a first section associated with a first visual indicator and a second, different section associated with a second, different visual indicator. As described above, the visual indicators may comprise colors, patterns, images of objects, or the like. At 504, and in response to receiving the request, the process 500 renders content from the first section of the digital work along with the first visual indicator associated with the first section. The process 500 may render the first visual indicator in response to determining that this content is associated with the first section, which in turn has been associated with the first visual indicator.

At 506, the process 500 renders, concurrently with the content from the first section, a progress gauge that includes a first segment corresponding to the first section of the digital work and a second, different segment corresponding to the second section of the digital work. As described above, the first segment of the rendered progress gauge includes the first visual indicator and the second segment includes the second visual indicator. For instance, the progress gauge may include the respective indicators within or adjacent to the corresponding segments of the progress gauge. Furthermore, in some instances, the progress gauge represents a user's progress through the digital work and is selectable to allow the user to navigate within the digital work.

At 508, the process 500 receives a request to navigate to content within the second section of the digital work. At 510, and in response, the process 500 renders the content from the second section of the digital work along with the second visual indicator associated with the second section. Finally, at 512, the process 500 renders, concurrently with the content from the second section, the progress gauge that includes the first segment with the first visual indicator and the second segment with the second visual indicator.

Figure 6:
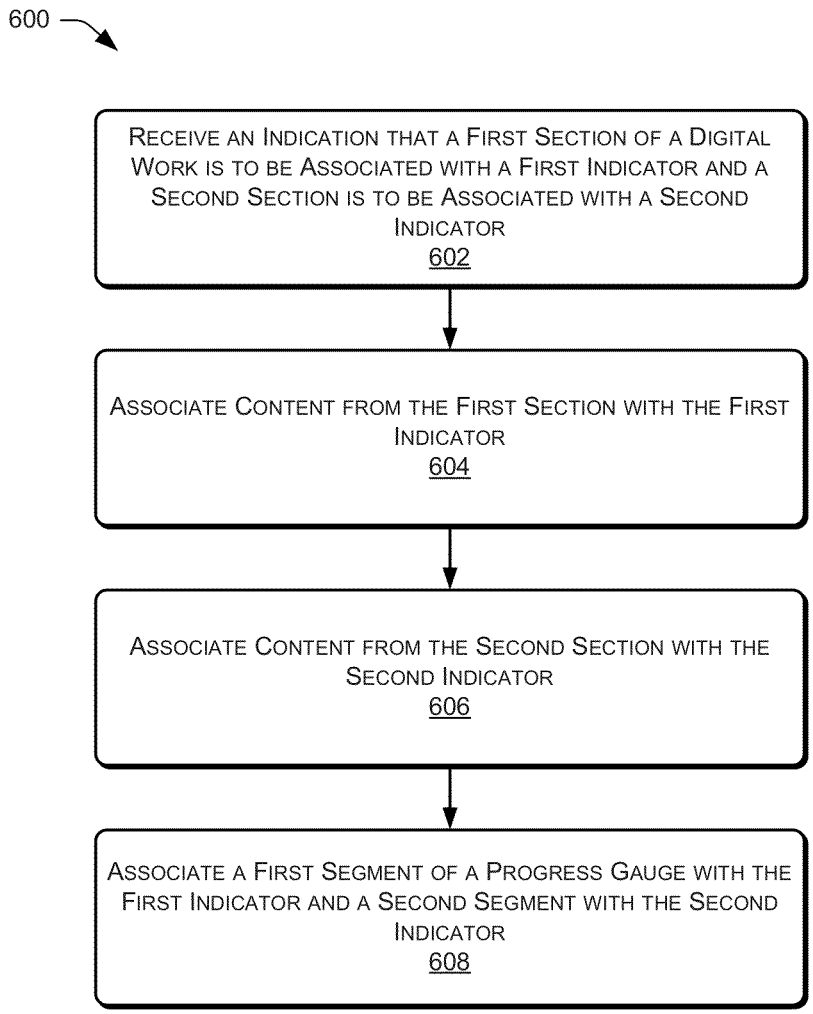
FIG. 6 illustrates an example process for associating different sections of content of a digital work with different unique indicators, as well as associating corresponding segments of a progress gauge with the indicators, to allow a user to more easily navigate within the digital work.

FIG. 6 illustrates an example process 600 for associating different sections of content of a digital work with different unique indicators, as well as associating corresponding segments of a progress gauge with the indicators, to allow a user to more easily navigate within the digital work. In some instances, one or more servers that provide content to the electronic device 102 implement some or all of the process 600. In these and other instances, the electronic device 102 may perform some or all of the process 600.

At 602, the process 600 receives an indication that a first section of a digital work is to be associated with a first indicator and a second, different section of the digital work is to be associated with a second, different indicator. These indicators may be common across all or substantially all copies of the digital work, or the indicators may be custom to one or more users. In the latter instances, users may individually select the indicators. At 604, and in response to the indication, the process 600 associates content from the first section with the first indicator such that a client device renders the first indicator when rendering content from the first section. For instance, the process 600 may associate each page of content within the first section of a digital work with a stripe of a first color, such that the client device will render the first-colored stripe along with each page of the first section of the digital work. Generally, the first and second indicators comprise unique indicators that are separate from the content (e.g., electronic book) itself. For instance, these indicators comprise some sort of indicator that is added (e.g., associated) to the content after a publisher of the content has provided the content to the servers that in turn provide the content to the electronic devices. For instance, the indicators may be added by an online merchant prior to providing copies of the content to client devices that purchase the content (e.g., electronic book).

Next, at 606, the process 600 associates content from the second section with the second indicator such that the client device renders the second indicator when rendering content from the second section. For instance, the process 600 may associate each page of content within the second section of a digital work with a stripe of a second color, such that the client device will render the second-colored stripe along with each page of the second section of the digital work. Finally, at 608, the process 600 associates a first segment of a progress gauge corresponding to the first section with the first indicator and a second segment of the progress gauge corresponding to the second section with the second indicator. By doing so, the client device will render the progress gauge with the corresponding indicators when the digital work is rendered on the client device. That is, when the client device renders the digital work, the device will render the first segment in the first color and the second segment in the second color, thus allowing a user to easily navigate to the corresponding sections of the digital work based on the unique color coding.

Logging Geographical Locations

Figure 7:
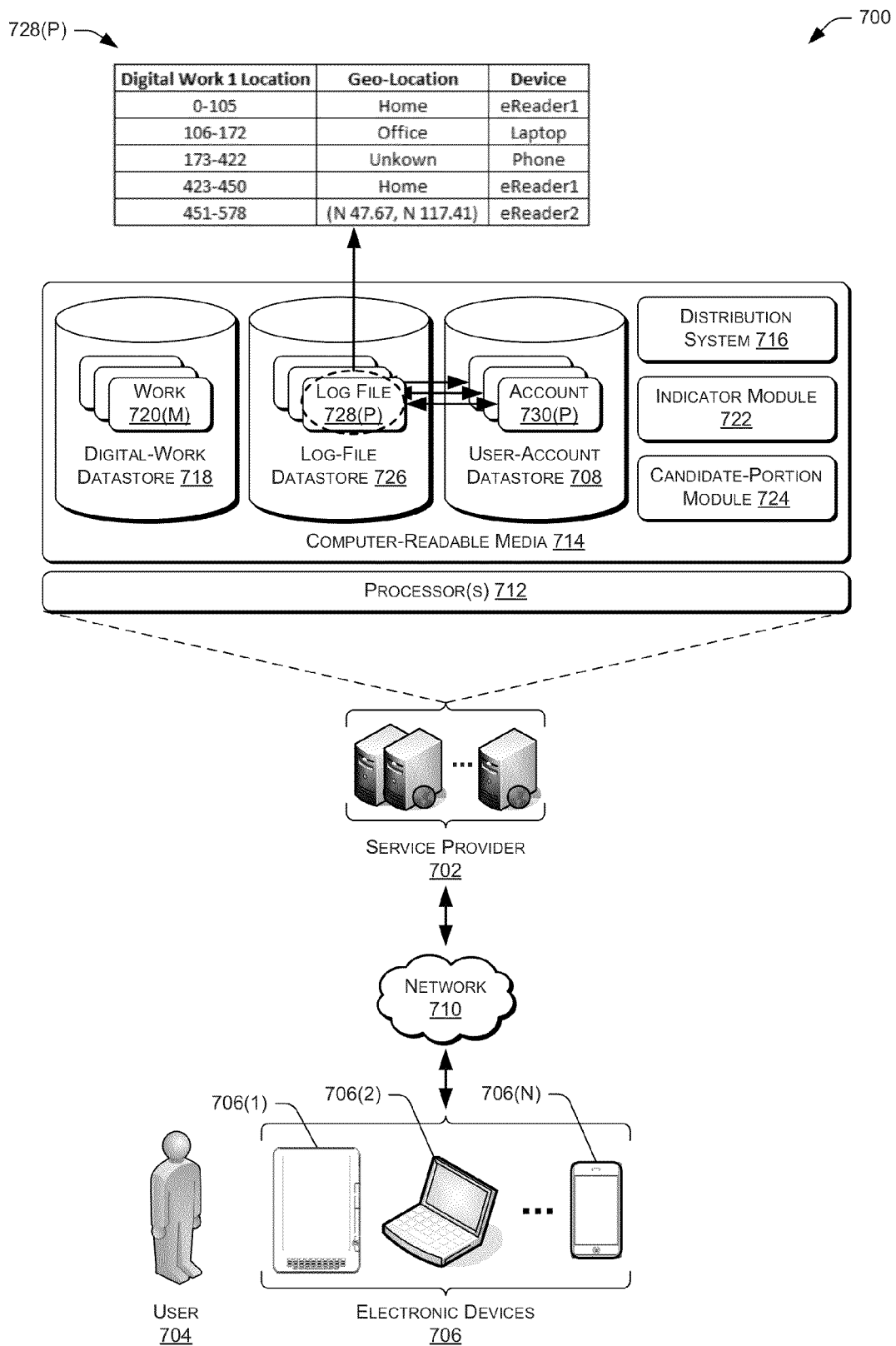
FIG. 7 illustrates an example architecture where a service provider maintains log files that stores information collected during a reading session of a user. For instance, these log files may store indications of where a user was located, geographically, when she read a particular portion of a digital work, which device rendered the particular portion, a time at day and/or date on which the device rendered this portion, and the like. By maintaining this information, the user is able to more easily locate content that she previously read.

FIG. 7 illustrates an example architecture 700 where a service provider 702 maintains log files that stores information collected during a reading session of a user 704. For instance, these log files may store indications of where a user was geographically when she read a particular portion of a digital work, which device rendered the particular portion, a time at day and/or date on which the device rendered this portion, and the like. By maintaining this information, the user is able to more easily locate content that she previously read.

As illustrated, the architecture includes the user 704, who is associated with one or more devices 706(1), 706(2), . . . , 706(N). For instance, the service provider 702 may have previously associated each of the user's devices 706 in a user account of the user 704 maintained in a user account datastore 708. In some instances, the service provider 702 also syncs the user's consumption of a digital work across the multiple devices 706. For instance, if the illustrated user reads to chapter seven of a particular digital work on the illustrated device 706(1), and later opens up the same digital work on the electronic device 706(N), the service provider 702 may send an indication of the user's current location to the device 706(N). As such, the device 706(N) may begin rendering the digital work at the beginning of chapter seven, where the user left off her last reading session.

When the user 704 consumes digital works with use of the devices 706, the devices 706 may provide information regarding this consumption to the service provider 702 over a network 710. This information may include an identification of the portions of a digital work rendered by the respective device, a geographical location of the user and the device during the rendering of these portions, a date, a time of day, and any other information associated with the session. The service provider 702 may receive and store this information with the user's explicit consent, such that the user 704 may later search for content based on this information. For instance, the user 704 may wish to re-read a portion of a digital work that she remembers reading at her office on her work computer. In response to this request, the service provider 702 may provide one or more candidate portions back to the user 704.

As illustrated, the service provider 702 may comprise one or more servers, which include one or more processors 712 and one or more computer-readable media 714. The computer-readable media 714 (and other computer-readable media described herein) stores a number of modules and data, and may include volatile and/or nonvolatile memory, removable and/or non-removable media, and the like, which may be implemented in any method or technology for storage of information, such as computer-readable instructions, data structures, program modules, or other data. Such media include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

In this example, the computer-readable media 714 stores or otherwise has access to a distribution system 716 and a digital-work datastore 718 storing one or more digital works 720(1), . . . , 720(M). The distribution system 716 provides functionality for providing digital works to client devices, such as the devices 706 associated with the user 704. In some instances, the distribution system 716 maintains an online storefront to allow the user 704 and other users to request and acquire digital works from the datastore 718 over the network 710.

In addition, the computer-readable media 714 stores or otherwise has access to an indicator module 722, which functions to associate different sections of content of a digital work with unique indicators, as well as different segments of progress gauges with the indicators, as described above. After associating the sections of the digital works and the segments of the progress gauges with the unique indicators, the module 722 may store these associations in the datastore 718 or in another datastore.

As illustrated, the computer-readable media 714 further stores a candidate-portion module 724. The candidate-portion module 724 may log certain information associated with a user's reading session to a log file associated with the user, as well as identify one or more candidate portions of a digital work based on information later specified by the user.

First, the module 724 may log certain information within a log-file datastore 726 that stores one or more log files 728(1), . . . , 728(P), each of which may be associated with a particular user account 730(1), . . . , 730(P) maintained within the user-account datastore 708. The module 724 may log an array of data to the corresponding log file, such as a user's geographical location when the user read a particular portion of a digital work, a device on which the user read the portion, a date, a time, or the like. The example log file 728(P), for instance, illustrates that the module 724 may map consumed portions of a particular digital work to geographical locations at which a user consumed the content and corresponding devices upon which the user consumed the content. Geographical locations may be measured in any way, such as with reference to global positioning satellite (GPS) coordinates, zip codes, IP addresses, or the like. Further, in some instances a user may configure her account to indicate defined locations. For instance, a user may specify when she is at "home" or at "the office" and the GPS coordinates accompanying this request may be stored in association with the user-designated terms "home" and "office".

Locations within a digital work, meanwhile, may be measured in any way, such as with reference to the number of characters, words, horizontal bands of content, bytes, multiples of bytes, or any other suitable unit of measurement. In some instances, locations within digital works are defined in terms of invariant location reference identifiers. Invariant location reference identifiers make it possible to identify and communicate a specific location or segment of content in the digital work, regardless of screen size, font type or size, resolution, or other display conditions of the computing device on which the digital work is displayed. Generally, this is accomplished by assigning unique reference identifiers at locations throughout the content of a digital work, or to individual segments of the digital work. These reference identifiers are not dependent on display conditions of a computing device on which the digital work is displayed. In that sense, the reference characters are invariant.

There are numerous ways of providing invariant location reference identifiers in, or in association with, content of a digital work. In addition, there are a variety of ways in which digital works may be partitioned and assigned invariant location reference identifiers. For example, each invariant location reference identifier may be assigned to an individual character or word, a group of words, a sentence, a paragraph, a band of text of predetermined size, a unit of data, or some other division of the digital work. Additional details of invariant location reference identification schemes can be found in U.S. patent application Ser. No. 11/693,677, filed on Mar. 29, 2007, and entitled "Invariant Referencing in Digital Works," which is incorporated herein by reference.

In this example, the illustrated log file 728(P) indicates that the example user 704 read from location 0 to location 105 of particular digital work while located at the user's home. The file also indicates that the user read this portion of the particular digital work on "eReader1", which in this example corresponds to the electronic device 706(1). In addition, the file 728(P) indicates that the user read from location 106 to location 172 at the user's office while on the user's laptop computer. The log file 728(P) includes multiple other entries associated with this particular digital work, and may include corresponding entries for each other digital work consumed by the user on one or more of the devices 706.

With this information, the user 704 may query the service provider 702 to locate a particular portion of the digital work that the user previously read. For instance, envision that the user 704 wishes to re-read a section of the digital work that she read at home, but she cannot remember exactly where this section is located within the digital work. In this scenario, the user 704 may send a query to the service provider 702 indicating information that she remembers about reading the passage she is looking for. For instance, she may specify that she remembers reading the desired page(s) at home and on the device 706(1) (possibly in addition to one or more other criteria).

In response to receiving this query the candidate-portion module 724 may access the log file 728(P) associated with the user 704 to identify one or more candidate portions of the digital work. After locating the candidate portions, then module 724 may then serve this information back to the requesting device.

Figure 8A:
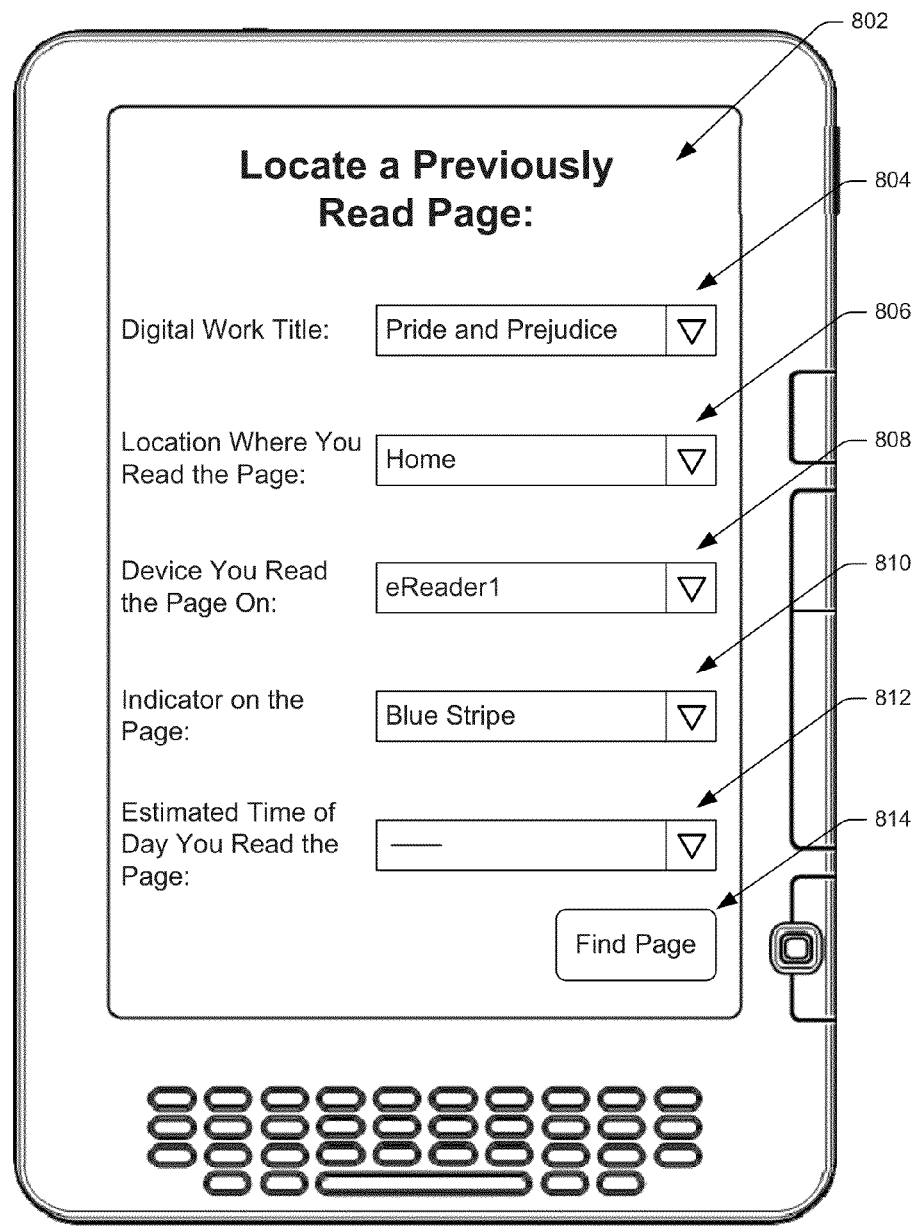
FIG. 8A illustrates an example UI that an electronic device may render to allow the user to locate a previously read page of content from a digital work.

FIG. 8A, for instance, illustrates an example user interface (UI) 802 that the electronic device 706(1) may render to allow the user 704 to locate a previously read page of content from a digital work. While FIG. 8A illustrates one example UI, it is to be appreciated that other implementations may employ any other sort of graphical or non-graphical UI. Furthermore, while the UI 802 shows a few example fields on which a user may search, other implementations may include more, fewer, and/or different fields. Further, these fields may comprise text boxes, drop-down boxes, menus, radio checklists, or the like.

To allow a user to locate a page of content that the user previously read, a first field 804 allows the user to specify a title of the digital work. For instance, the example UI 802 includes a drop-down menu that allows the user to select from digital works stored on or otherwise accessible to the device 706(1). This may consist of those digital works previously purchased or otherwise obtained by a user associated with the device. In this example, the user is looking for content with the digital work entitled "Pride and Prejudice".

A field 806, meanwhile, allows a user to specify where the user remembers reading the page she is looking for. In some instances, and as described above, the user may have previously associated certain GPS coordinates with textual descriptors, such as "home", "office", "park", etc. Here, the user recalls reading the desired page at home, which is shown as the selected location.

Next, a field 808 allows a user to specify which of multiple devices associated with the user's account she recalls reading the page on. In this example, the user recalls reading the desired page on "eReader1", which corresponds to the electronic device 706(1) in this example. In some instances, the user may also specify, in a field 810, a unique indicator that the user recalls seeing on the page. For instance, the user may recall seeing a blue stripe on the side of the page. In some instances, the user may also specify a second-level indicator, as discussed above.

A field 812 also allows the user to specify a time of day that the user remembers reading the page. In some instances, this may comprise a specific time, a range of time (e.g., 7:00-8:00 pm PST), a general descriptor of time (e.g., morning, evening, etc.), or the like. In this example, the user has not selected an estimated time. Finally, the example UI 802 includes an icon 814 (entitled "Find Page") that, when selected, either sends the query to the service provider 702 or causes a search to be performed locally on the device 706(1), depending upon whether the corresponding log file is maintained on the provider 702 or the device 706(1).

Figure 8B:
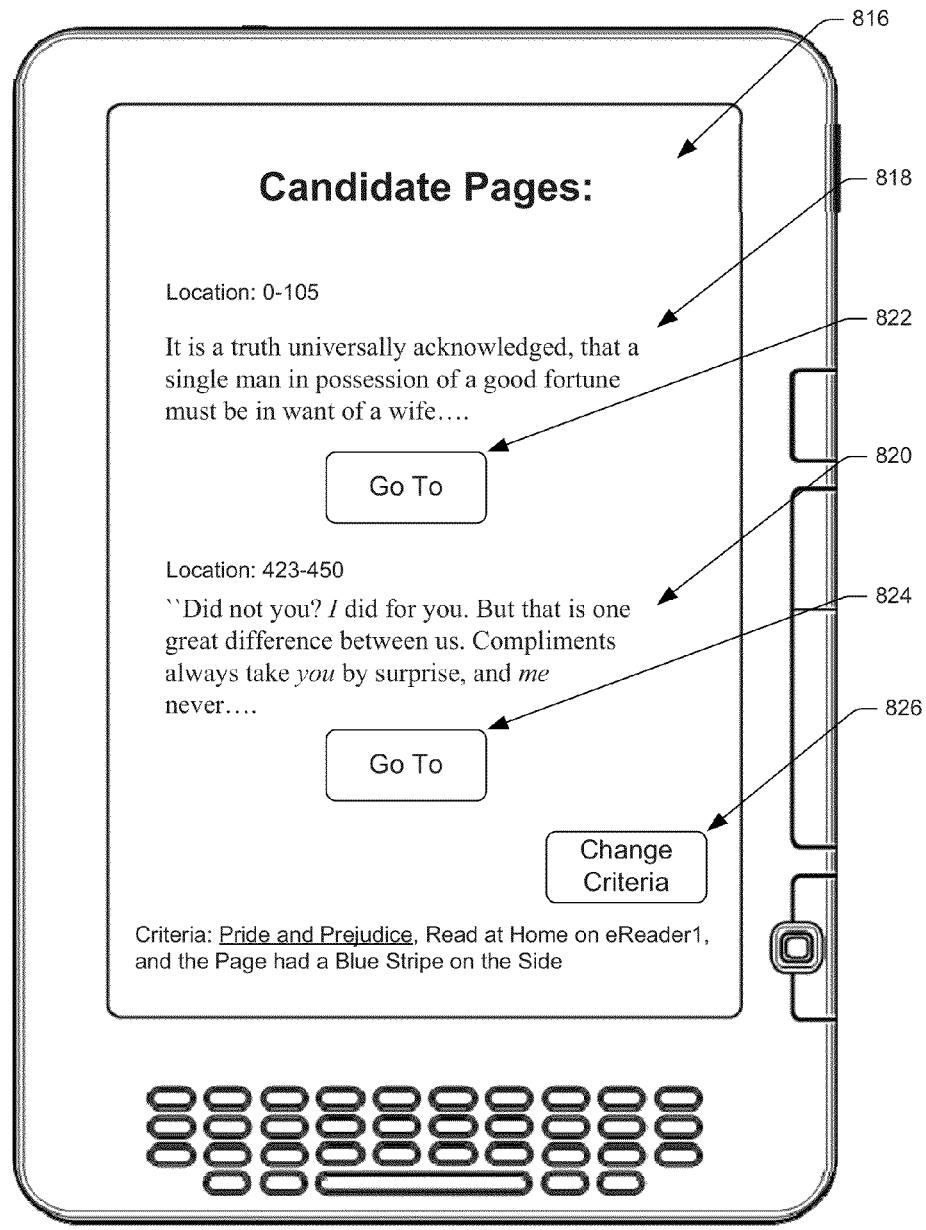
FIG. 8B illustrates an example UI that an electronic device may render in response to receiving the user's request via the UI of FIG. 8A. Here, the service provider or the electronic device has identified two candidate pages of content based on the search criteria provided by the user in FIG. 8A.

FIG. 8B illustrates an example UI 816 that the electronic device 706(1) may render in response to receiving the user's request via the UI 802 of FIG. 8A. Here, the service provider 702 or the electronic device 706(1) has identified two candidate pages 818 and 820 of content based on the search criteria provided by the user in FIG. 8A. In some instances, the returned candidate pages may comprise those pages that exactly match the specified criteria, while in other instances they comprise the pages that most closely match the criteria. The UI 816 also includes selectable icons 822 and 824 that, when selected, cause the device 706(1) to render the selected page. In addition, the UI 816 includes an icon 826 that allows the user to select new and/or different criteria (e.g., a different device, a different geographical location, etc.).

In addition or in the alternative, the electronic device 706 (1) may provide UIs that allow a user to generally navigate their reading history, rather than query their reading history as described with reference to the UIs of FIGS. 8A and 8b. For instance, the electronic device 706(1) or the service provider 702 may store the information described above regarding a user's reading history on a per-work or per-session basis, and the user may be able to navigate through these histories.

To provide an example, the device 706(1) may store details regarding the different sessions during which the user read the digital work "Pride and Prejudice". The user may then peruse this history to see that she read the first section (locations 0-105) of the digital work at home on her device 706(1), a second section (locations 106-172) at her office on her laptop, and so forth. This reading history may also include the date and time of day associated with the sessions, any notes, highlights, or other annotations that the user made during the respective sessions, a snippet of the text corresponding to the beginning and/or end location of the respective session, and/ or any other information associated with the different reading sessions.

In another example, the electronic device 706(1) may surface these histories on a chronological basis across all works consumed by a user. For instance, the device 706(1) may surface a UI showing that the user read a first section of "Pride and Prejudice" on a particular day, before then reading a different digital work later on the same day, and so forth. Again, this UI may include some or all of the additional information described above (e.g., geolocation data, a device that the user read on, etc.).

Figure 9:
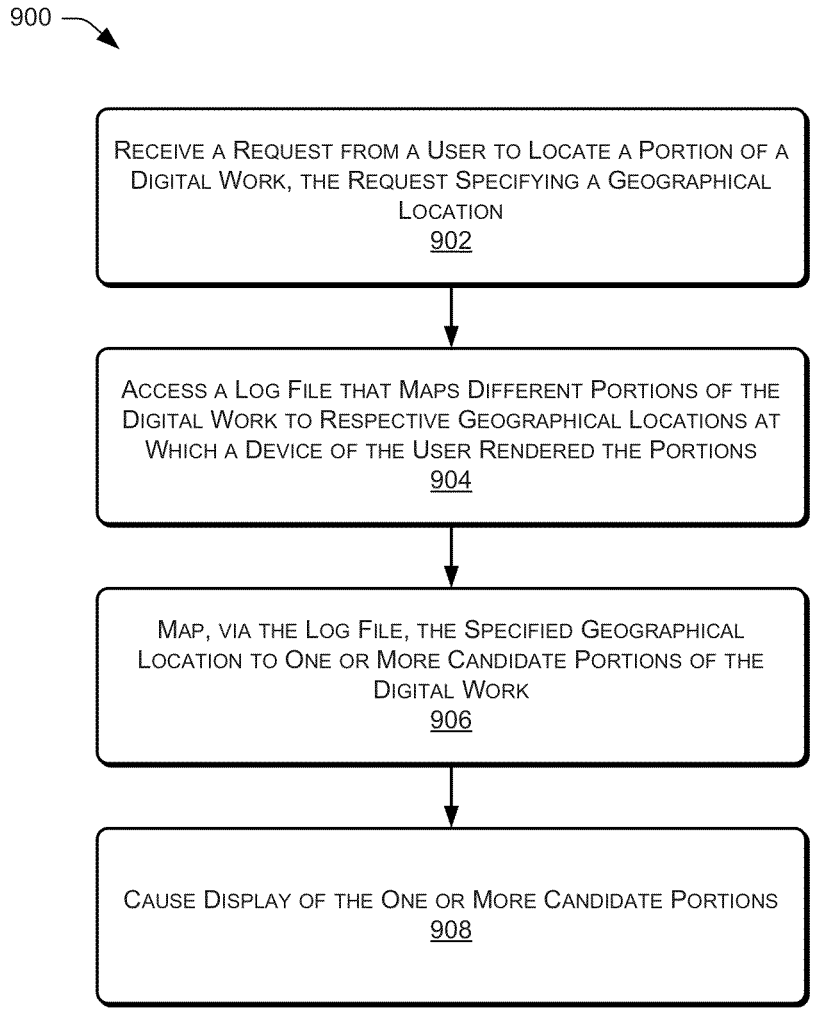
FIG. 9 illustrates an example process for locating candidate portions of a digital work based at least in part on matching a specified geographical location to a geographical location within a log file, the log file mapping different portions of a digital work to respective geographical locations at which a user accessed the different portions.

FIG. 9 illustrates an example process 900 for locating candidate portions of a digital work based at least in part on matching a specified geographical location to a geographical location within a log file, the log file mapping different portions of a digital work to respective geographical locations at which a user accessed the different portions. The service provider 702, a client device, and/or another entity may implement the process 900.

At 902, the process 900 receives a request to locate a portion of a digital work previously rendered by a device associated with a user, the request specifying a geographical location of the user when a device associated with the user rendered the portion of the digital work. At 904, and in response, the process 900 accesses a log file that maps different portions of the digital work to respective geographical locations at which a device associated with the user rendered the different portions of the digital work.

At 906, the process maps, via the log file, the specified geographical location to one or more candidate portions of the digital work. For instance, the process 900 may identify geographical locations within the log file that match the specified location or are within a threshold distance of the specified location. In instances where the request specified one or more additional criteria (e.g., a device on which the user was reading, a date range, a time range, etc.), then the mapping may also be based on attempting to match the additional specified criteria to corresponding information within the log file.

Finally, at 908, the process causes display of the one or more candidate portions of the digital work. For instance, the process 900 may display a page of content that the process 900 determines is most likely to represent the desired page. In another example, the process 900 may cause display of a UI that allows a user to select from multiple different candidate portions identified at 906.

Example Electronic Device

Figure 10:
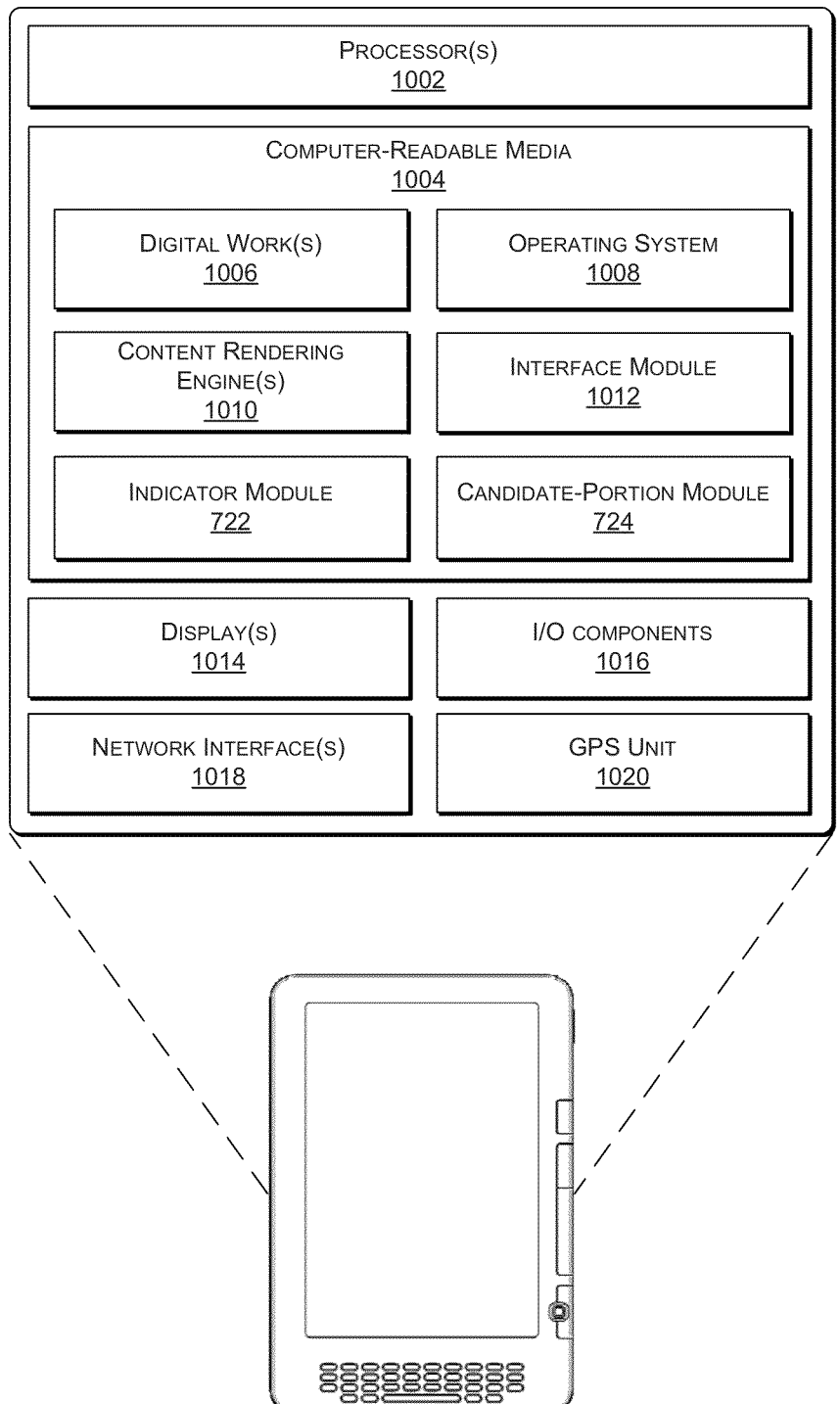
FIG. 10 illustrates selected components of an electronic device configured to implement the techniques described herein.

FIG. 10 illustrates selected components of an electronic device 1000 configured to implement the techniques described herein. While FIG. 10 illustrates one implementation of an electronic device, other implementations may include more or fewer components.

In a very basic configuration, the electronic device 1000 includes one or more processors 1002 and computer-readable media 1004, as described above. Depending on the configuration of the electronic device 102, the computer-readable media 1004 may be a type of computer storage media and may include volatile and nonvolatile memory. Thus, the computer-readable media 1004 may include, but is not limited to, RAM, ROM, EEPROM, flash memory, or other memory technology, or any other medium which can be used to store media items or applications and data which can be accessed by the electronic device 1000.

The computer-readable media 1004 may be used to store any number of functional components that are executable on the processors 1002. In many embodiments, these functional components comprise instructions or programs that are executable by the processors 1002 and that implement operational logic for performing the actions attributed above to the electronic device 1000. In addition, the computer-readable media 1004 may store various types of data that are referenced by executable programs.

The computer-readable media 1004 may store one or more digital works 1006, which may include applications, videos, text files, audio files, or the like. The computer-readable media 1004 may also store an operating system 1008 for managing resources of the electronic device 1000 and for providing common services to various applications operating on the device 1000. The computer-readable media 1004 may further include one or more content rendering engines 1010 for rendering the digital works 1006 on the device 1000.

An interface module 1012 may also reside in the computer-readable media 1004 and execute on the processors 1002 to provide for user operation of the electronic device 1000. The interface module 1012 may provide menus and other navigational tools to facilitate selection and rendering of content items. The interface module 1012 may further include a browser or other application that facilitates access to sites over a network, such as websites or other sources of electronic content items.

In addition, the computer-readable media 1004 may store or otherwise have access to the indicator module 722 and/or the candidate-portion module 724. These modules may perform some or all of their respective functionality described above. In some instances, meanwhile, some or all of the functionality is performed remotely from the electronic device 1000, such as on the service provider 702.

The electronic device 1000 may further include one or more displays 1014, which may render some of the digital works 1006. In some instances, the display(s) include a touch screen display to receive and interpret user touches. The display(s) may comprise a liquid crystal display (LCD), a light-emitting diode (LED) display, an electronic paper display, and/or any other type of display or combination of displays.

The electronic device 1000 may further include various input/output (IO) components 1016. Such devices may include various user interface controls (e.g., buttons, joystick, keyboard, etc.), microphones, connection ports, and so forth, as well as speakers, additional displays, and the like.

One or more network interfaces 1018 may support both wired and wireless connection to various networks, such as cellular networks, radio, WiFi networks, short range networks (e.g., Bluetooth), IR, and so forth. The device 1000 may also include a global positioning satellite (GPS) unit 1020 for identifying a location of the device 1000, which may be provided and logged at the service provider 702 as described above. In other instances, meanwhile, this location data may be determined in one or more other ways, such as with use of triangulation techniques, IP-address lookup techniques, and the like.

The electronic device 1000 may have additional features or functionality. For example, the electronic device 1000 may also include a battery and power control unit, which powers the device and operatively controls an amount of power, or electrical energy, consumed by the device. In addition, the electronic device 1000 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

I claim:

1. An electronic device comprising:
one or more displays;
one or more processors; and
one or more computer-readable media storing computer-executable instructions that, when executed on the one or more processors, cause the one or more processors to perform acts comprising:
  rendering, on the one or more displays, at least a portion of a digital work that includes discrete sections, each of the discrete sections including a plurality of pages and being associated with a respective unique visual indicator, wherein each page of the plurality of pages includes the respective unique visual indicator associated with the respective section of the digital work; and
  rendering, on the one or more displays, a progress bar that includes discrete segments corresponding to the discrete sections of the digital work, each of the discrete segments including an image of the respective unique visual indicator corresponding to the respective section of the digital work, wherein:
the unique visual indicators comprise top-level unique visual indicators,
a first section of the discrete sections of the digital work comprises multiple different portions of content, each of the multiple different portions of content including a respective second-level unique visual indicator different from the top-level unique visual indicators, and
the acts further comprise rendering, on the one or more displays, a respective second-level unique visual indicator along with a respective top-level unique visual indicator when the electronic device renders a corresponding portion of content of the first section of the digital work.

2. An electronic device as recited in claim 1, wherein the visual indicators comprise indicators that are separate from the digital work and have been added to the digital work after publishing of the digital work.

3. An electronic device as recited in claim 1, wherein the visual indicators are unique to the digital work relative to other digital works.

4. An electronic device as recited in claim 1, wherein the discrete sections comprise one or more of chapters, acts, stories, scenes, or equal portions of the digital work.

5. An electronic device as recited in claim 1, wherein the visual indicators comprise one or more of different colors, different patterns, or images of different objects.

6. An electronic device as recited in claim 1, the acts further comprising:
receiving a request to zoom in on a segment of the progress bar corresponding to the first section of the digital work; and
at least partly in response to receiving the request to zoom in:
enlarging the segment of the progress bar corresponding to the first section of the digital work; and
rendering, within or adjacent to the segment of the progress bar and on the one more displays, at least a portion of the second-level unique visual indicators corresponding to the first section of the digital work.

7. An electronic device as recited in claim 1, the acts further comprising:
receiving a request to zoom in on a segment of the progress bar corresponding to the first section of the digital work; and
at least partly in response to receiving the request to zoom in:
enlarging the segment of the progress bar corresponding to the first section of the digital work; and
rendering, within or adjacent to the segment of the progress bar and on the one or more displays, one or more thumbnail views of content within the first section of the digital work, each of the one or more thumbnail views being selectable to render a full view of the corresponding content on the one or more displays.

8. An electronic device as recited in claim 1, wherein the acts further comprise rendering, on the one or more displays, the progress bar along with the respective unique visual indicator and the content such that the respective unique visual indicator and the image of the respective unique visual indicator are rendered concurrently.

9. An electronic device as recited in claim 1, wherein the acts further comprise:
rendering the image on or in the progress bar at a first location on the one or more displays; and
rendering the respective unique visual indicator on the one or more displays, at a second location on the one or more displays different from the first location, while the image of the respective unique visual indicator is rendered.

10. A method comprising:
under control of an electronic device that includes one or more displays and that is configured with specific executable instructions,
receiving a request to render at least a portion of a digital work, the digital work including a first section associated with a first visual indicator and a second, different section associated with a second, different visual indicator;
at least partly in response to receiving the request:
rendering, on the one or more displays, content from the first section of the digital work, the content from the first section including a first plurality of pages, and each page of the first plurality of pages including:
the first visual indicator corresponding to the first section, and
a respective second-level unique visual indicator different from the first and second visual indicators;
rendering, on the one or more displays and concurrently with the content from the first section, one of the respective second-level unique visual indicators along with the first visual indicator associated with the first section; and
rendering, on the one or more displays and concurrently with the content from the first section and the first visual indicator, a progress gauge separate from the first visual indicator, the progress gauge including a first segment corresponding to the first section of the digital work and a second, different segment corresponding to the second section of the digital work, the first segment including an image of the first visual indicator associated with the first section of the digital work and the second segment including an image of the second visual indicator associated with the second section of the digital work.

11. A method as recited in claim 10, wherein the first visual indicator is rendered along with the content of the first section at least partly in response to determining that the content is associated with the first section of the digital work.

12. A method as recited in claim 10, wherein the progress gauge represents a user's progress through the digital work and is selectable to allow the user of the electronic device to navigate to different locations within the digital work.

13. A method as recited in claim 10, wherein:
the first visual indicator comprises a first color;
the second visual indicator comprises a second, different color;
the rendered content from the first section of the digital work is rendered in or along with the first color; and
the first segment of the progress gauge is rendered in or along with the first color and the second segment of the progress gauge is rendered in or along with the second color.

14. A method as recited in claim 10, wherein:
the first visual indicator comprises an image of a first object;
the second visual indicator comprises an image of a second, different object;
the rendered content from the first section of the digital work is rendered with the image of the first object; and
the image of the first object is rendered in or adjacent to the first segment of the progress gauge and the image of the second object is rendered in or adjacent to the second segment of the progress gauge.

15. A method as recited in claim 10, wherein:
the first visual indicator comprises an image of a first pattern;
the second visual indicator comprises an image of a second, different pattern;
the rendered content from the first section of the digital work is rendered along with the first pattern; and the first segment of the progress gauge is rendered in or along with the first pattern and the second segment of the progress gauge is rendered in or along with the second pattern.

16. A method as recited in claim 10, wherein:
each section of the digital work is associated with a visual indicator that is unique relative to each other visual indicator associated with a section of the digital work; and
the progress gauge includes a segment for each section of the digital work, each segment including a visual indicator corresponding to the respective section of the digital work.

17. A method as recited in claim 10, wherein the first visual indicator, the second visual indicator, or both has been selected and associated with the respective section of the digital work by a user of the electronic device.

18. A method as recited in claim 10, further comprising:
receiving a request to navigate to content within the second section of the digital work;
at least partly in response to receiving the request to navigate to the content within the second section:
rendering, on the one or more displays, the content from the second section of the digital work along with the second visual indicator associated with the second section; and
rendering, on the one or more displays and concurrently with the content from the second section, the progress gauge that includes the first segment including the first visual indicator associated with the first section of the digital work and the second segment including the second visual indicator associated with the second section of the digital work.

19. One or more computing devices comprising:
one or more processors; and
one or more non-transitory computer-readable media storing computer-executable instructions that, when executed on the one or more processors, cause the one or more processors to perform acts comprising:
receiving an indication that a first section of a digital work is to be associated with a first indicator and a second, different section of the digital work is to be associated with a second, different indicator;
at least partly in response to receiving the indication:
associating each page of content from the first section with the first indicator and with a respective second-level unique visual indicator different from the first and second indicators such that a client device renders one of the respective second-level unique visual indicators along with the first indicator whenever a page of content from the first section is rendered;
associating content from the second section with the second indicator such that the client device renders the second indicator when rendering content from the second section; and
associating a first segment of a progress gauge corresponding to the first section with the first indicator and a second segment of the progress gauge corresponding to the second section with the second indicator, the progress gauge to be rendered concurrently with and separate from at least one of the first indicator or the second indicator when at least a portion of the digital work is rendered.

20. One or more computing devices as recited in claim 19, wherein the first and second indicators comprise visual indicators, audible indicators, or combinations thereof.

21. One or more computing devices as recited in claim 19, wherein:
the digital work includes multiple sections in addition to the first and second sections;
the indication indicates that each of the multiple additional sections is to be associated with a respectively unique indicator; and
the acts further comprise associating the multiple additional sections with the respectively unique indicators and associating corresponding segments of the progress gauge with the respectively unique indicators.

22. One or more computing devices as recited in claim 19, wherein the progress gauge includes content dividers to represent sections of the digital work, and wherein the progress gauge indicates a currently rendered location of the digital work relative to the respective sections.

23. A method comprising:
under control of an electronic device that includes a display and that is configured with specific executable instructions,
rendering, on the display, content from a first section of a digital work, the first section comprising a plurality of pages of the digital work, wherein the first section is one of a plurality of sections of the digital work;
rendering, on the display and concurrently with the content from the first section, a progress gauge that includes a plurality of segments, each segment of the plurality of segments corresponding to a respective section of the plurality of sections, wherein the progress gauge is selectable to allow a user of the electronic device to navigate to different locations within the digital work, and wherein the progress gauge indicates the user's progress through the digital work;
outputting, via the device, a first indicator indicative of the first section, wherein the first indicator is outputted with each page of the plurality of pages;
associating each page of the plurality of pages with a respective second-level unique visual indicator different from the first indicator such that one of the respective second-level unique visual indicators is outputted by the device along with the first indicator whenever a page of the plurality of pages is rendered;
receiving, at least partially via the progress gauge, a request from the user to render content from a second section of the plurality of sections; and
at least partly in response to receiving the request:
rendering, on the display, content from the second section,
rendering the progress gauge on the display concurrently with the content from the second section, and
outputting, via the device, a second indicator, different from the first indicator and the respective second-level unique visual indicators, indicative of the second section.

24. The method as recited in claim 23, further including:
rendering the first indicator at a first location on the display concurrently with the content from the first section, the first indicator comprising a first visual indicia;
rendering the progress bar, at a second location on the display different from the first location, concurrently with the first indicator, the progress bar including an image of the first indicator at the second location; and
rendering the second indicator on the display concurrently with the content from the second section, the second indicator comprising a second visual indicia different from the first visual indicia, wherein a first segment of the plurality of segments includes the first visual indicia and a second segment of the plurality of segments includes the second visual indicia.

25. The method as recited in claim 23, wherein:
the plurality of segments comprises a first segment corresponding to the first section of the digital work and a second segment corresponding to the second section of the digital work,
the first section includes a first amount of content and the second section includes a second amount of content greater than the first amount, and
the first segment has a first dimension and the second section has a second dimension greater than the first dimension, wherein the first and second dimensions are based on the first and second amounts of content, respectively.

26. The method as recited in claim 23, further including:
receiving, at least partially via the progress gauge, a request to zoom in on content of the digital work within in the first section; and
at least partly in response to receiving the request to zoom in:
   rendering, on the display, one or more thumbnail views of content within the first section, each of the one or more thumbnail views being selectable to render a full view of the corresponding content on the display.

27. The method as recited in claim 26, wherein the progress gauge is selectable to allow the user to navigate each of the one or more thumbnail views.

\* \* \* \* \*